US005974158A

United States Patent [19]
Auty et al.

[11] Patent Number: 5,974,158
[45] Date of Patent: Oct. 26, 1999

[54] AIRCRAFT DETECTION SYSTEM

[75] Inventors: Glen William Auty, Montmorency; Michael John Best, Box Hill; Timothy John Davis, Ivanhoe; Ashley John Dreier, Epping; Ian Barry MacIntyre, Rosanna, all of Australia

[73] Assignee: The Commonwealth of Australia Commonwealth Scientific and Industrial Research Organization, Campbell, Australia

[21] Appl. No.: 08/827,309

[22] Filed: Mar. 28, 1997

[30] Foreign Application Priority Data

Mar. 29, 1996 [AU] Australia .............................. PN9032/96
Apr. 1, 1996 [AU] Australia .............................. PN9009/96

[51] Int. Cl.$^6$ .................................................. G06K 9/00
[52] U.S. Cl. .......................................... 382/103; 382/236
[58] Field of Search .................................... 382/103, 107, 382/236, 282, 291, 174, 176, 101; 348/169, 164, 142, 144, 161; 250/338.1, 203.6

[56] References Cited

U.S. PATENT DOCUMENTS

| 4,857,912 | 8/1989 | Everett, Jr. et al. ................. 340/825.3 |
| 4,937,878 | 6/1990 | Lo et al. .................................. 382/103 |
| 5,134,472 | 7/1992 | Abe .......................................... 348/700 |
| 5,243,418 | 9/1993 | Kuno et al. .............................. 348/155 |
| 5,386,482 | 1/1995 | Basso et al. ............................. 382/101 |
| 5,406,501 | 4/1995 | Florent .................................... 348/169 |
| 5,680,479 | 10/1997 | Wang et al. ............................. 382/176 |

FOREIGN PATENT DOCUMENTS

| B-35311/93 | 7/1993 | Australia . |
| 0686943 A2 | 12/1995 | European Pat. Off. . |
| 2227589 | 8/1990 | United Kingdom . |
| WO 90/01706 | 2/1990 | WIPO . |
| WO 93/19441 | 9/1993 | WIPO . |
| WO 93/21617 | 10/1993 | WIPO . |
| WO 96/12265 | 4/1996 | WIPO . |

*Primary Examiner*—Joseph Mancuso
*Assistant Examiner*—Vikkram Bali
*Attorney, Agent, or Firm*—Nixon & Vanderhye P.C.

[57] ABSTRACT

An object detection system including passive sensors for receiving electromagnetic radiation from a moving object and generating intensity signals representative of the received radiation, and a processing system for subtracting the intensity signals to obtain a differential signature representative of the position of the moving object. An image acquisition system including at least one camera for acquiring an image of at least part of a moving object, in response to a trigger signal, and an analysis system for processing the image to locate a region in the image including markings identifying the object and processing the region to extract the markings for optical recognition.

44 Claims, 33 Drawing Sheets

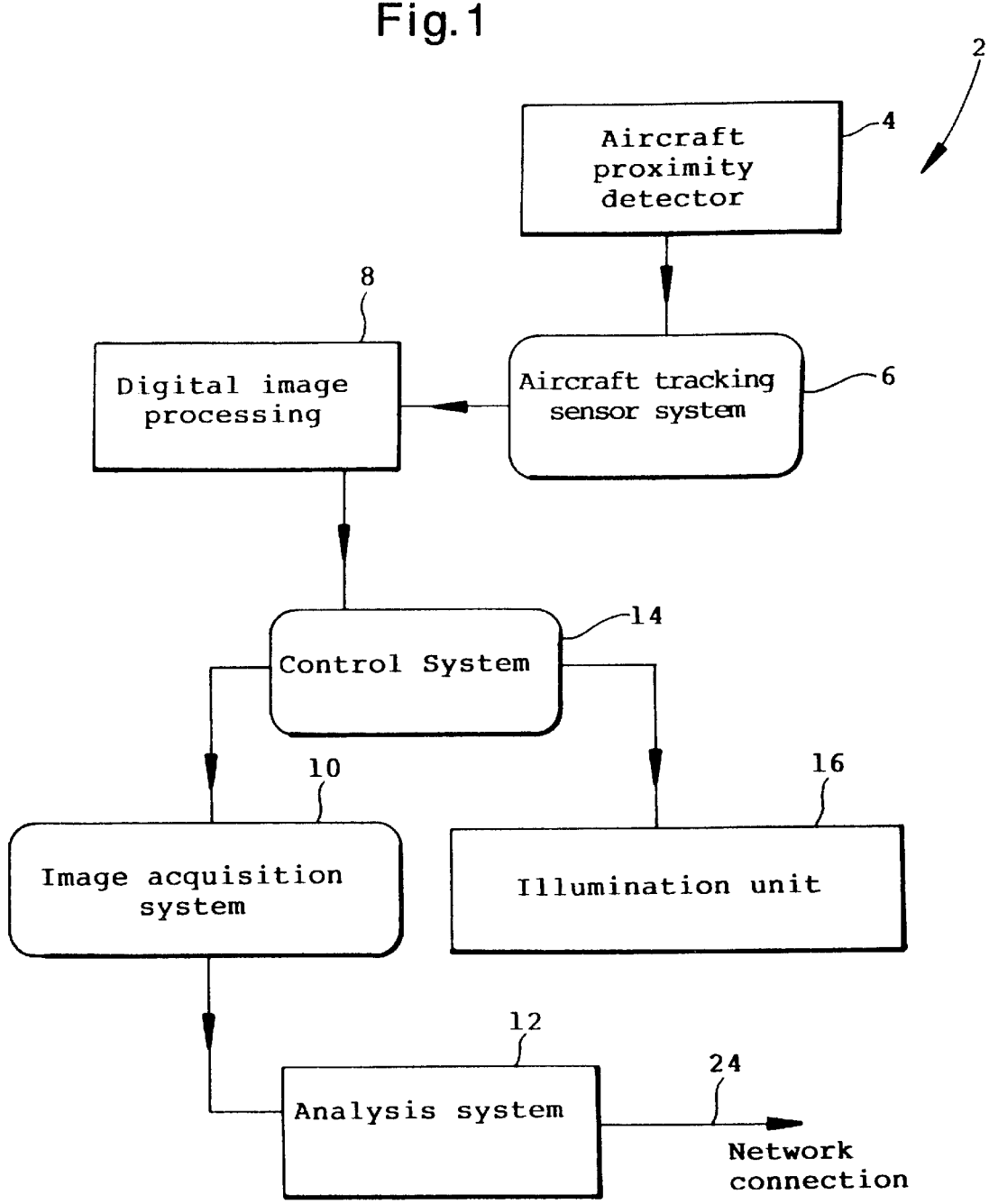

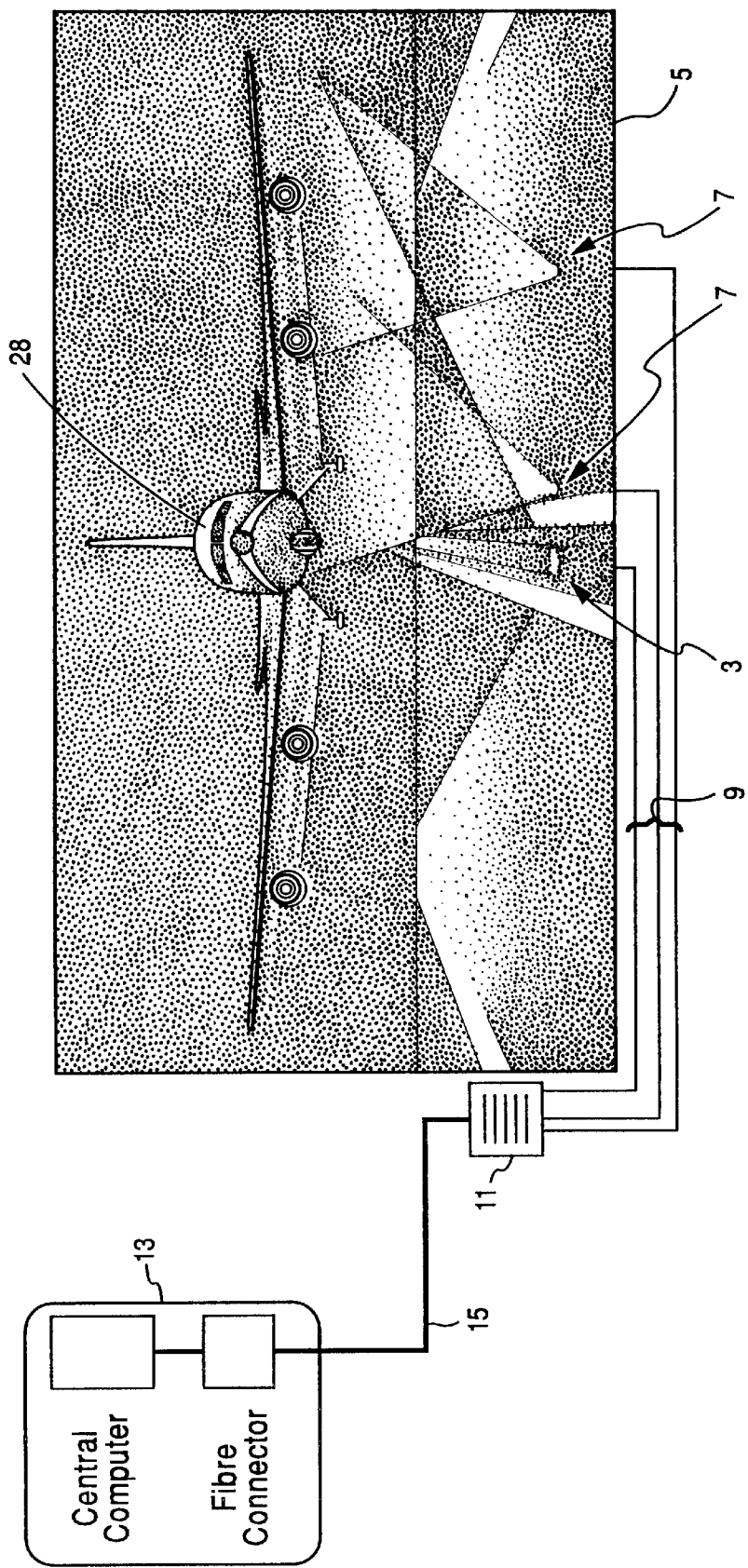

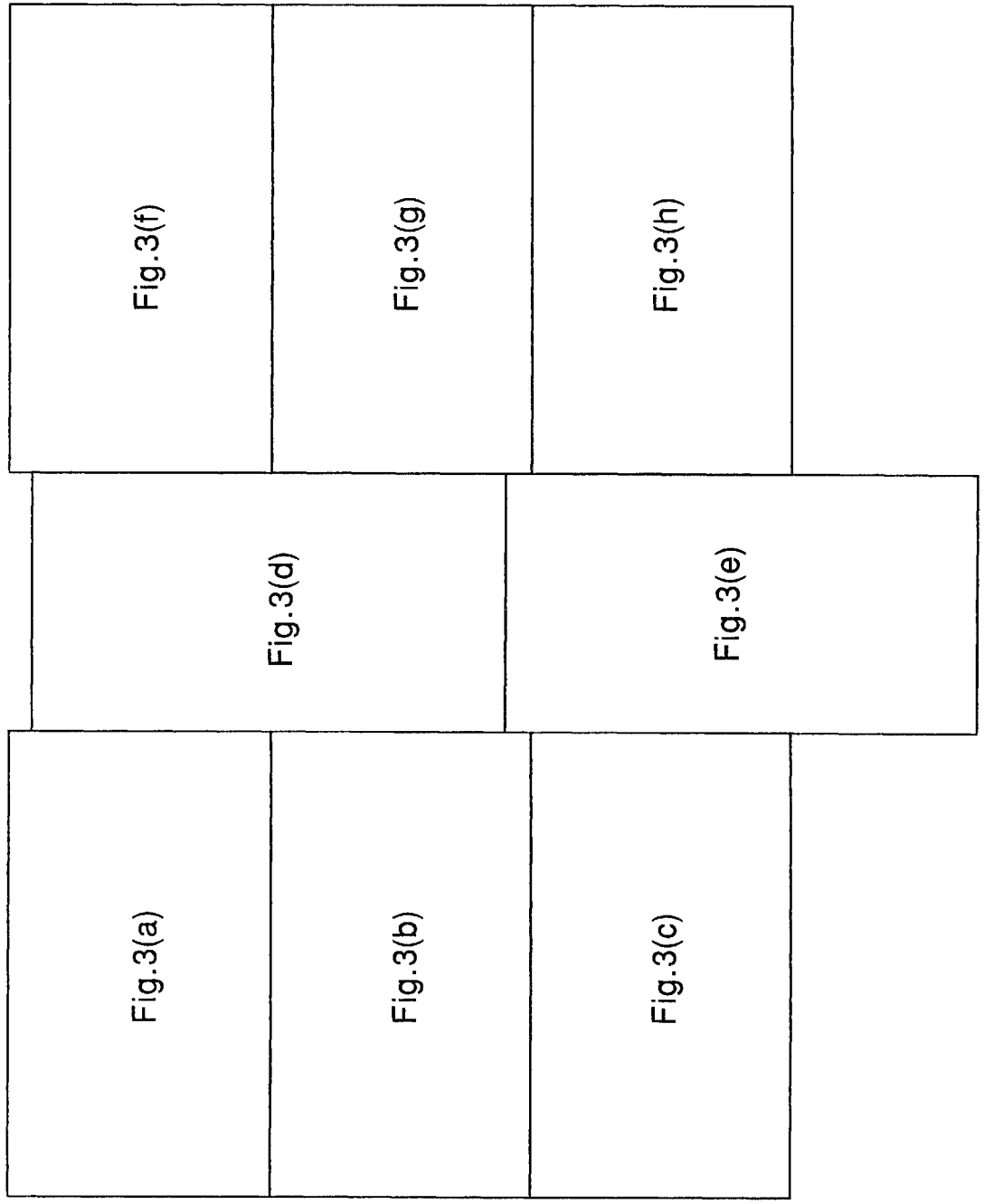

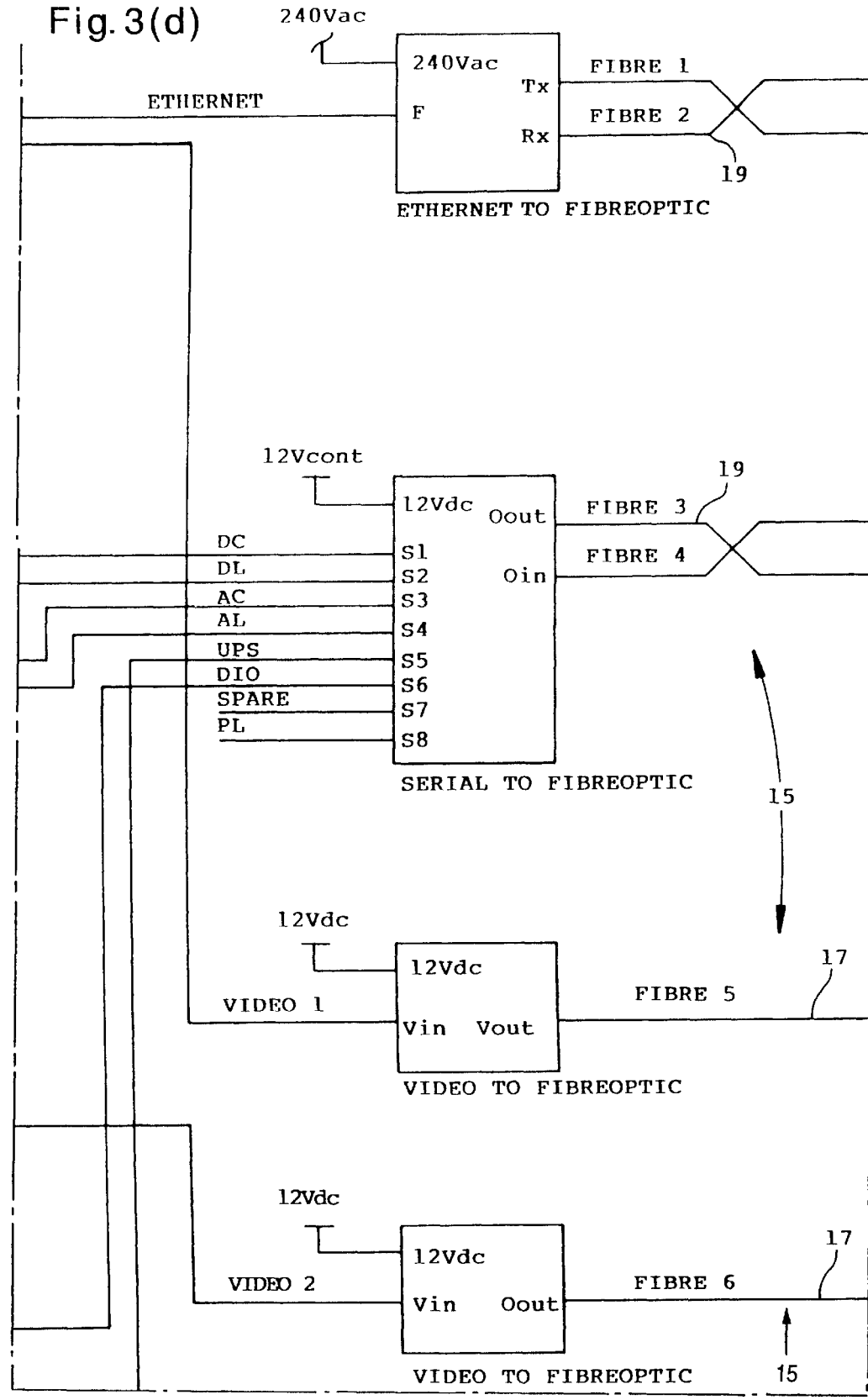

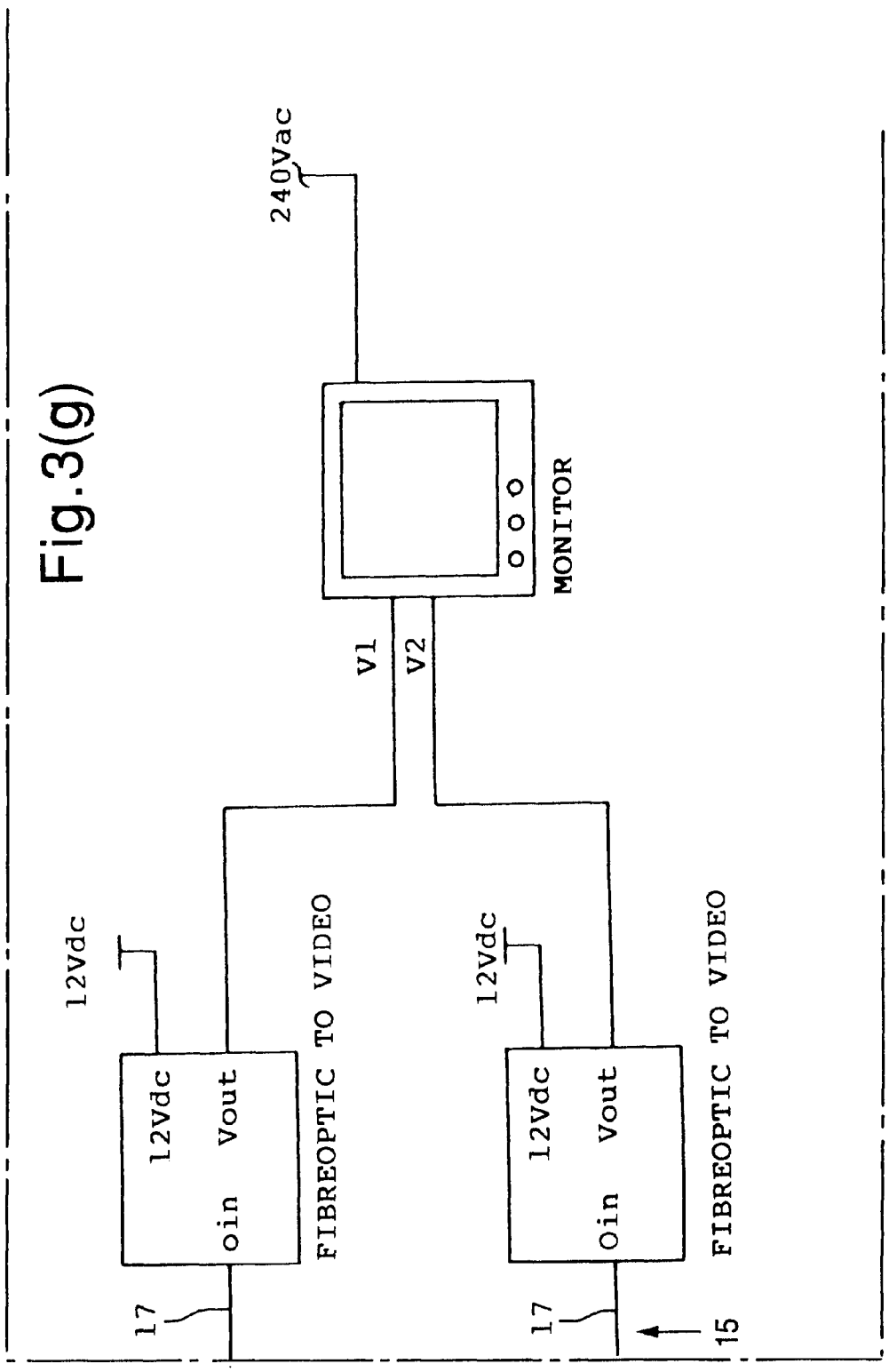

115

117

118

AIRCRAFT DETECTION SYSTEM

FIELD OF THE INVENTION

The present invention relates to an object detection system and, in particular to an aircraft detection system.

RELATED ART

The International Civil Aviation Organisation (ICAO) has established regulations which require all civil aircraft to have registration markings beneath the port wing to identify an aircraft. The markings denote the nationality of an aircraft and its registration code granted by the ICAO. In some countries, airline operators do not follow the regulations and the markings appear on an aircraft's fuselage. Owners of aircraft are charged for airport use, but a satisfactory system has not been developed to automatically detect aircraft and then, if necessary, administer a charge to the owner. Microwave signals for detecting an aircraft can interfere with microwave frequencies used for airport communications and, similarly, radar signals can interfere with those used for aircraft guidance systems. A system which can be used to detect an aircraft using unobtrusive passive technology is desired.

SUMMARY OF THE INVENTION

In accordance with the present invention there is provided an object detection system including:
  passive sensing means for receiving electromagnetic radiation from a moving object and generating intensity signals representative of the received radiation; and
  processing means for subtracting said intensity signals to obtain a differential signature representative of the position of said moving object.

The present invention also provides an image acquisition system including:
  at least one camera for acquiring an image of at least part of a moving object, in response to a trigger signal, and analysis means for processing said image to locate a region in said image including markings identifying said object and processing said region to extract said markings for a recognition process.

The present invention also provides an object detection method including:
  passively sensing electromagnetic radiation received from a moving object;
  generating intensity signals representative of the received radiation; and
  subtracting said intensity signals to obtain a differential signature representative of the position of said moving object.

The present invention also provides an image acquisition method including:
  acquiring an image of at least part of a moving object, in response to a trigger signal, using at least one camera, and
  processing said image to locate a region in said image including markings identifying said object and processing said region to extract said markings for a recognition process.

BRIEF DESCRIPTION OF THE DRAWINGS

Preferred embodiments of the present invention are hereinafter described, by way of example only, with reference to the accompanying drawings, wherein:

FIG. 1 is a block diagram of a preferred embodiment of an aircraft detection system;

FIG. 2 is a schematic diagram of a preferred embodiment of the aircraft detection system;

DETAILED DESCRIPTION OF EXEMPLARY EMBODIMENTS

Figure 3A:
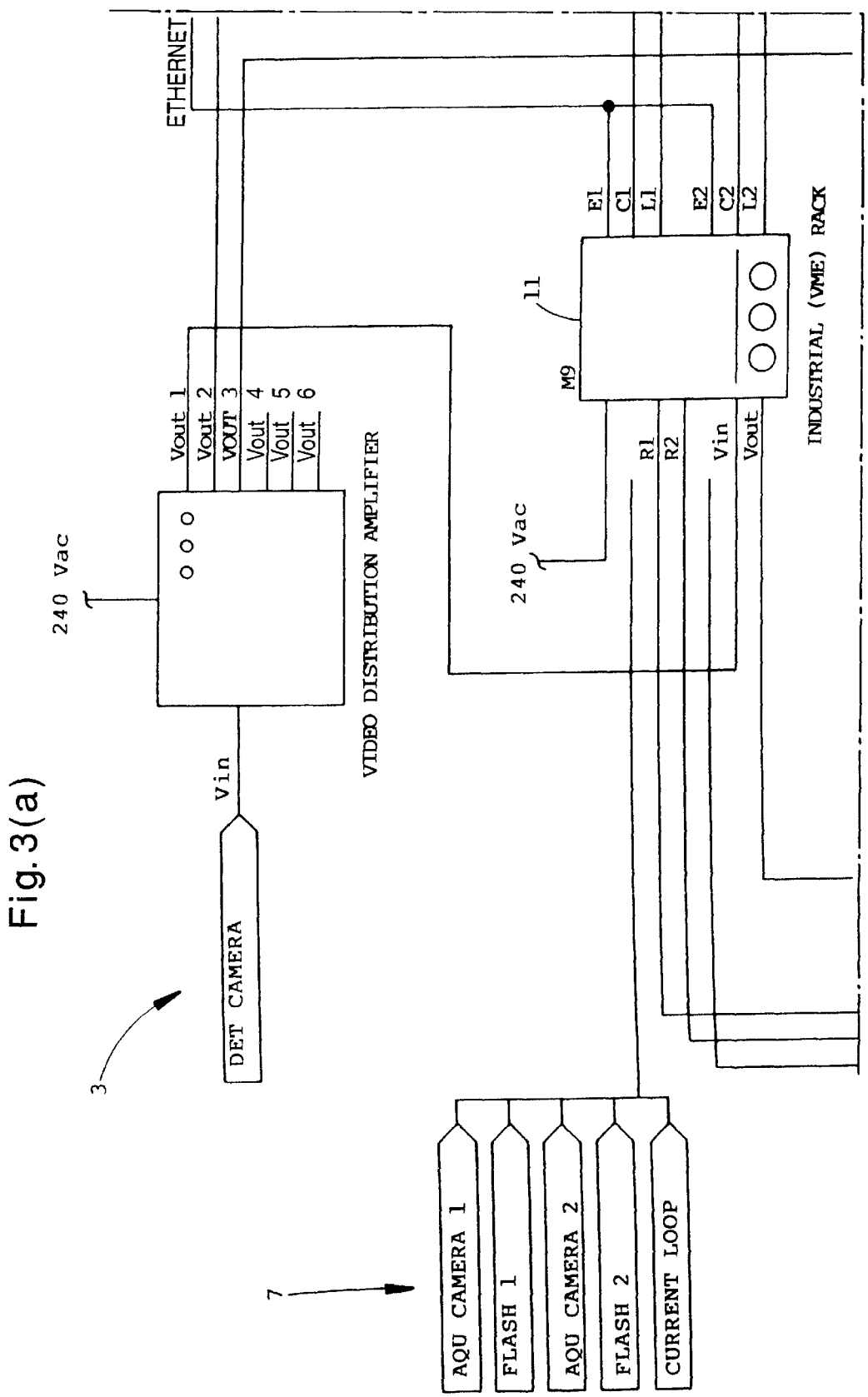
FIG. 3 is a block diagram of a connection arrangement for components of the aircraft detection system.
Figure 3B:
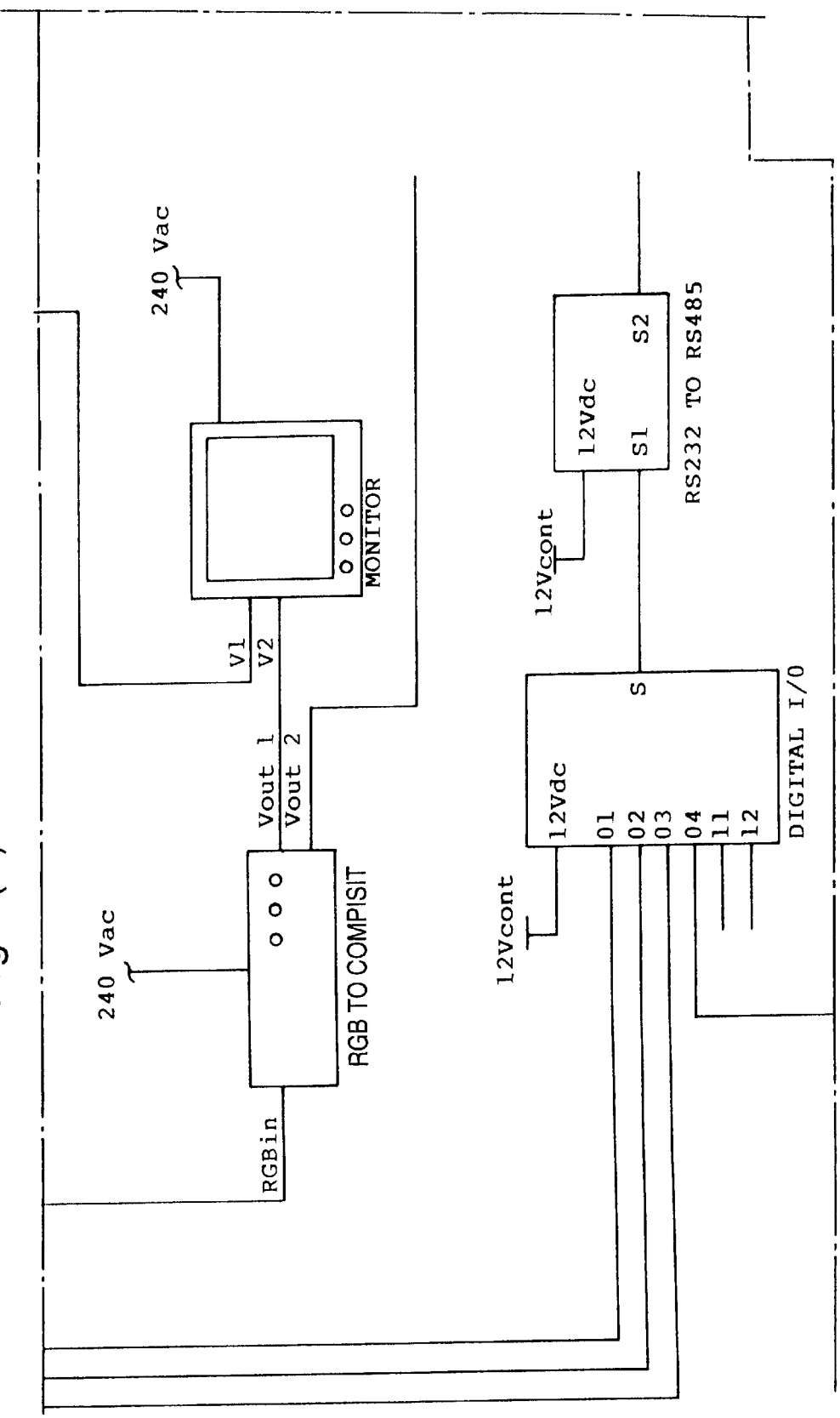
Figure 3C:
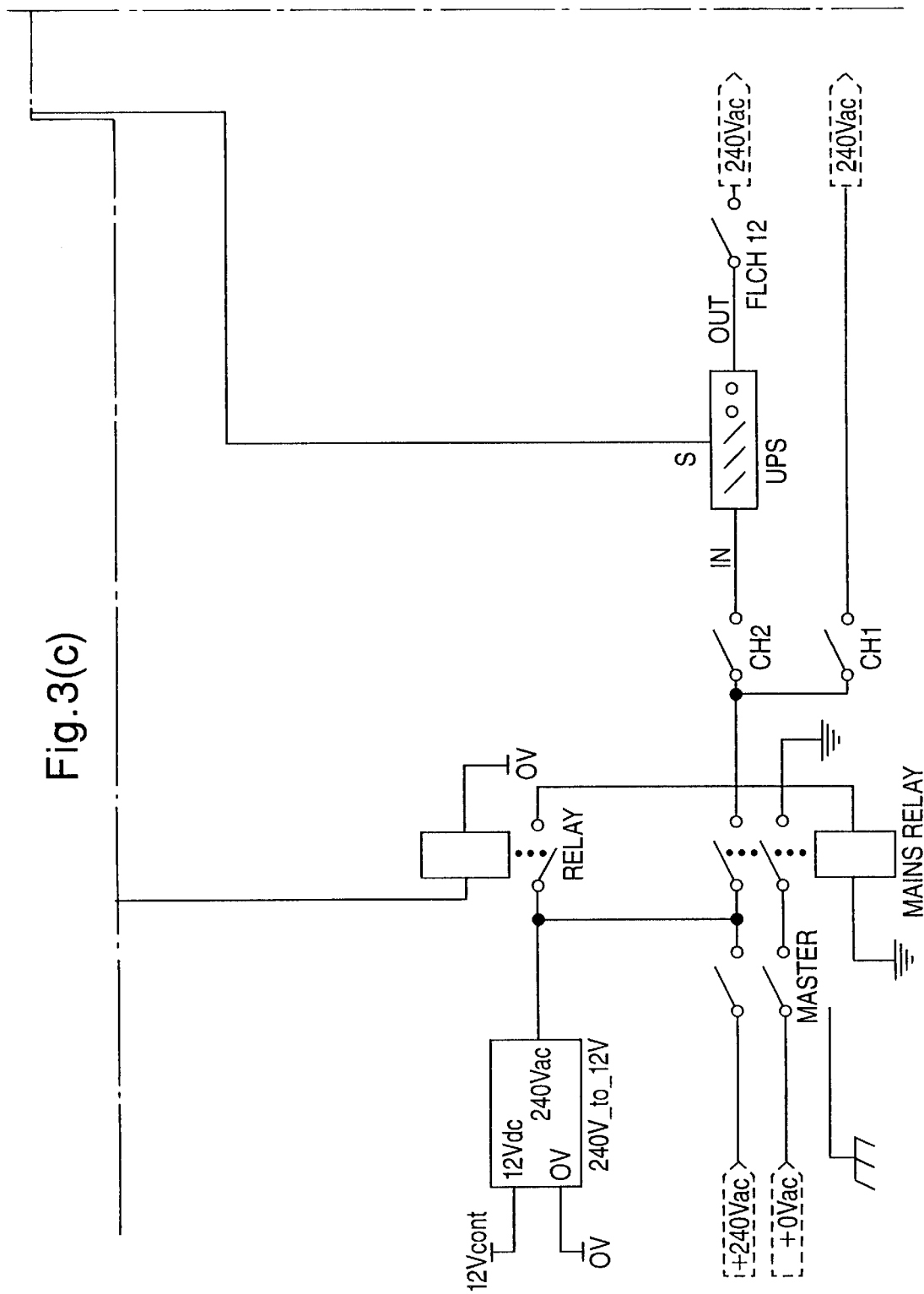
Figure 3E:
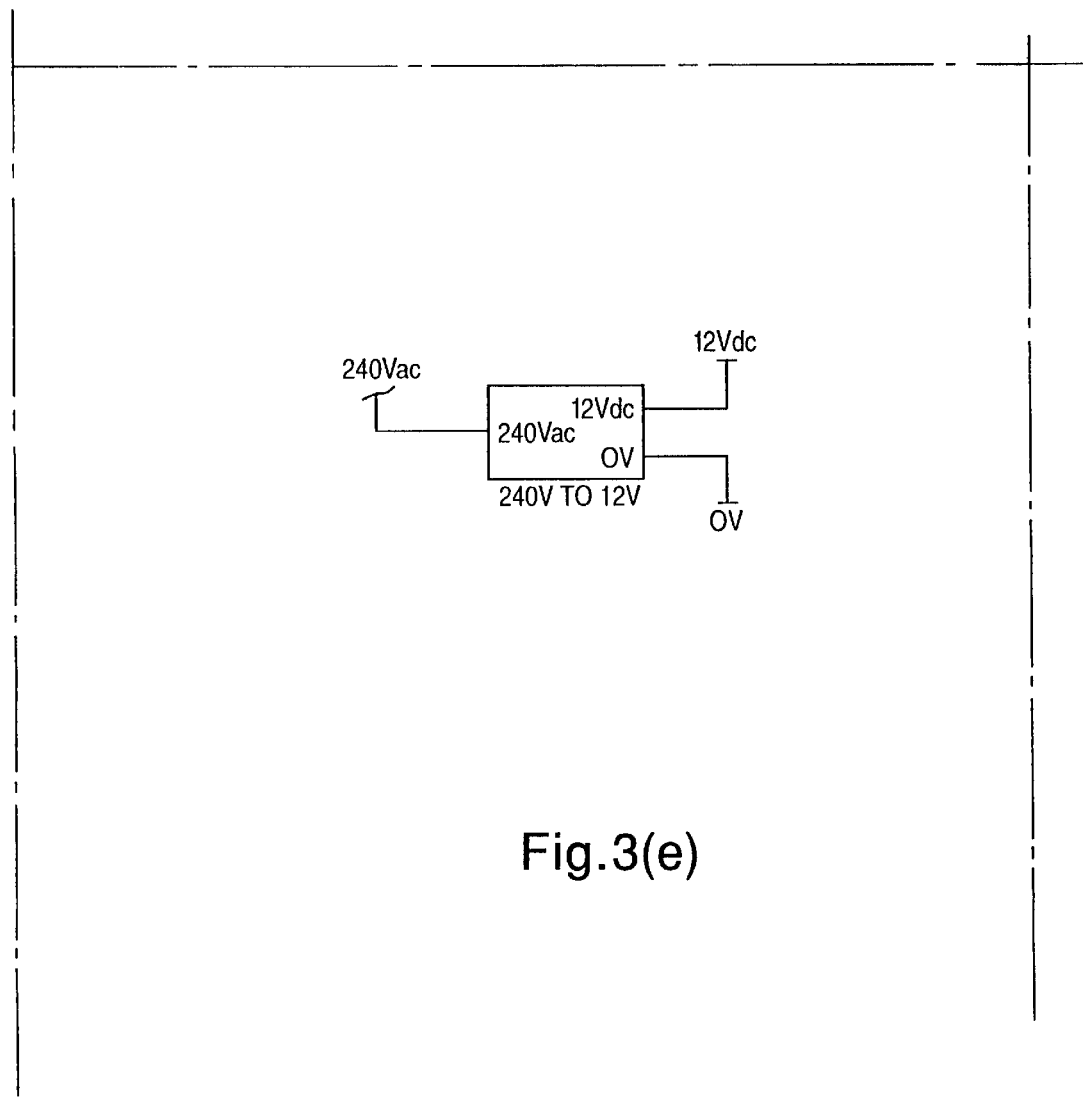
Figure 3F:
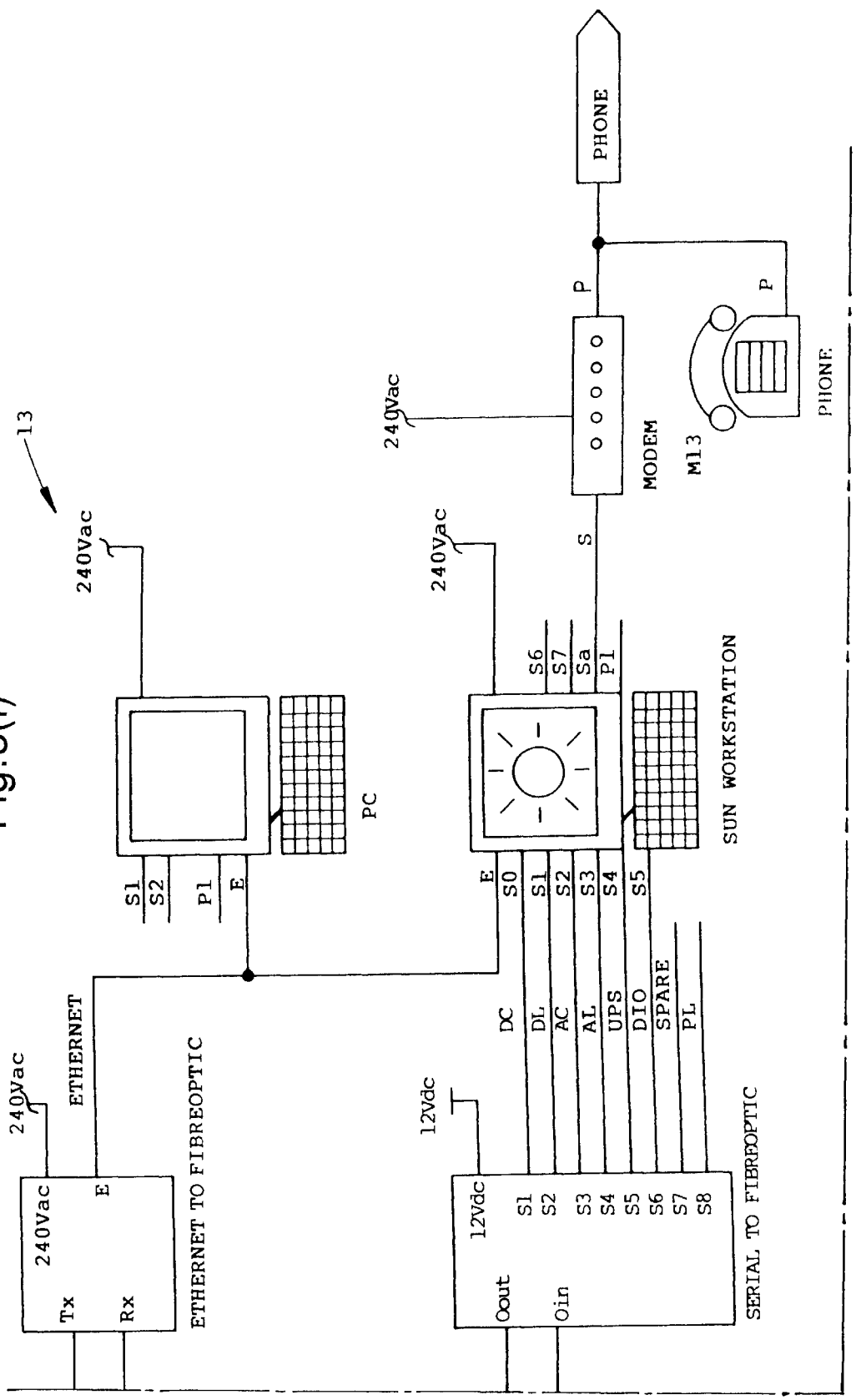
Figure 3H:
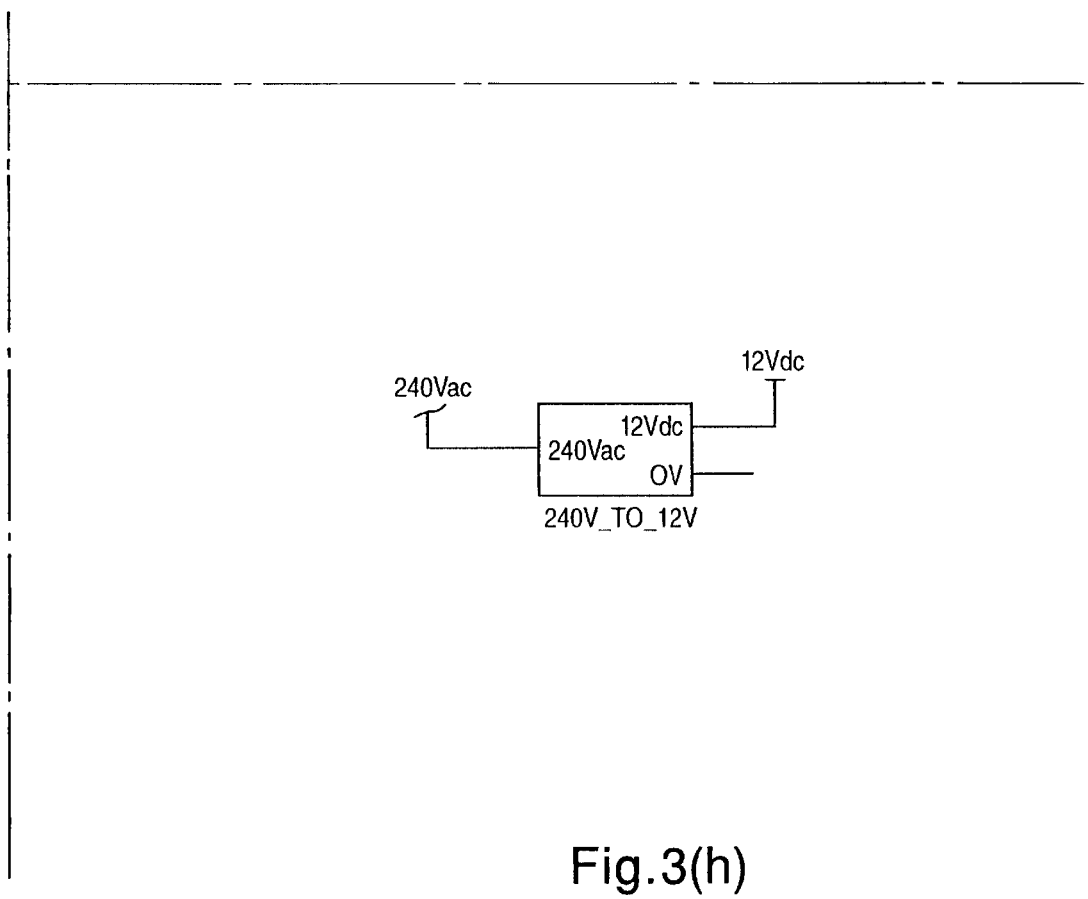

An aircraft detection system 2, as shown in FIG. 1, includes a proximity detector 4, a tracking sensor system 6, an image processing system 8, an image acquisition system 10 and an analysis system 12. A control system 14 can be included to control the image acquisition system 10 on the basis of signals provided by the image processing system 8, and also control an illumination unit 16.

The proximity detector 4 and the tracking sensor system 6 includes sensors 3 which may be placed on or near an aircraft runway 5 to detect the presence of an aircraft 28 using visual or thermal imaging or aural sensing techniques. Also located on or near the runway 5 is at least one high resolution camera 7 of the image acquisition system 10. The sensors 3 and the acquisition camera 7 are connected by data and power lines 9 to an instrument rack 11, as shown in FIG. 2, which may be located adjacent or near the runway 5. The instrument rack 11 may alternatively be powered by its own independent supply which may be charged by solar power. The instrument rack 11 includes control circuitry and image processing circuitry which is able to control activation of the sensors 3 and the camera 7 and perform image processing, as required. The instrument rack 11, the data and power lines 9, the sensors 3 and the acquisition camera 7 can be considered to form a runway module which may be located at the end of each runway of an airport. A runway module can be connected back to a central control system 13 using an optical fibre or other data link 15. Images provided by the sensors 3 may be processed and passed to the central system 13 for further processing, and the central system 13 would control triggering of the acquisition cameras 7. Alternatively image processing for determining triggering of the acquisition camera 7 may be performed by each instrument rack 11. The central control system 13 includes the analysis system 12. One method of configuring connection of the instrument racks 11 to the central control system 13 is illustrated in FIG. 3. The optical fibre link 15 may include dedicated optical fibres 17 for transmitting video signals to the central control system 13 and other optical fibres 19 dedicated to transmitting data to and receiving data from the central control system 13 using the Ethernet protocol or direct serial data communication. A number of different alternatives can be used for connecting the runway modules to the central control system 13. For example, the runway modules and the control system 13 may be connected as a Wide Area Network (WAN) using Asynchronous Transfer Mode (ATM) or Synchronous Digital Hierarchy (SDH) links. The runway modules and the central control system 13 may also be connected as a Local Area Network (LAN) using a LAN protocol, such as Ethernet. Physical connections may be made between the runway modules and the central control system 13 or alternatively wireless transmission techniques may be used, such as using infrared or microwave signals for communication.

Figure 4:
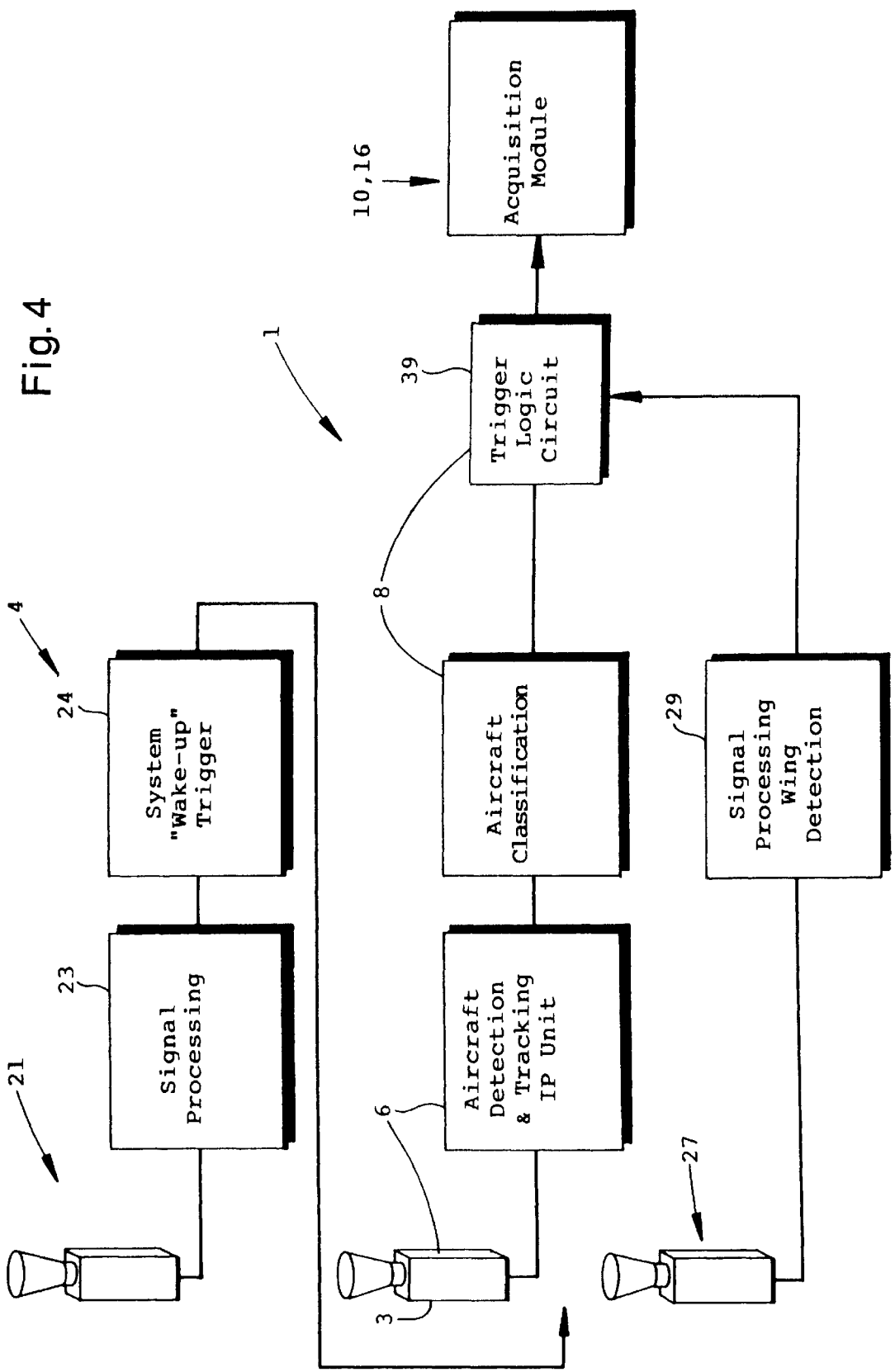
FIG. 4 is a more detailed block diagram of a proximity detector and a tracking system for the aircraft detection system.
Figure 5:
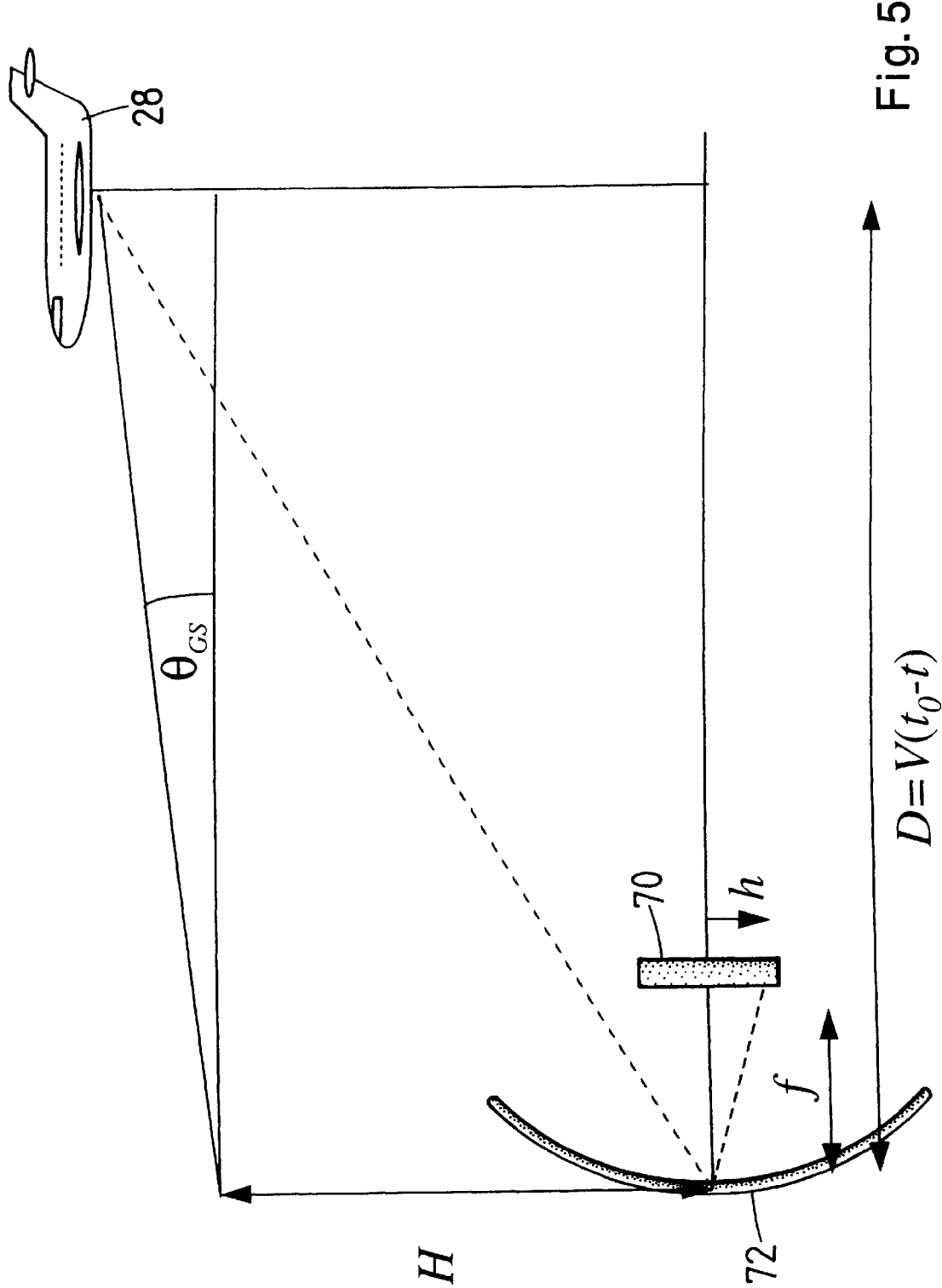
FIG. 5 is a coordinate system used for the proximity detector.

The proximity detector 4 determines when an aircraft is within a predetermined region, and then on detecting the presence of an aircraft activates the tracking sensor system 6. The proximity detector 4, as shown in FIG. 4, may include one or more pyroelectric devices 21, judiciously located at an airport, and a signal processing unit 23 and trigger unit 25 connected thereto in order to generate an activation signal to the tracking sensor system 6 when the thermal emission of an approaching aircraft exceeds a predetermined threshold. The proximity detector 4 may use one or more pyroelectric point sensors that detect the infrared radiation emitted from the aircraft 28. A mirror system can be employed with a point sensor 70 to enhance its sensitivity to the motion of the aircraft 28. The point sensor 70 may consist of two or more pyroelectric sensors configured in a geometry and with appropriate electrical connections so as to be insensitive to the background infrared radiation and slowly moving objects. With these sensors the rate of motion of the image of the aircraft 28 across the sensor 70 is important. The focal length of the mirror 72 is chosen to optimise the motion of the image across the sensor 70 at the time of detection. As an example, if the aircraft at altitude H with glide slope angle $\theta_{GS}$ moves with velocity V and passes overhead at time $t_0$,
as shown in FIG. 5, then the position h of the image of the aircraft 28 on the sensor 70 is $$h = f\left(\frac{H}{V(t_o - t)} + \tan\theta_{GS}\right) \quad (1)$$

where f is the focal length of a cylindrical mirror.

If the rate of motion of the image dh/dt is required to have a known value, then the focal length of the mirror 72 should be chosen to satisfy $$f = v\frac{(t_o - t)^2}{H}\frac{dh}{dt} \quad (2)$$

where $t_0-t$ is the time difference between the time $t_0$ at which the aircraft is overhead and the time t at which it is to be detected. Alternatively, the proximity detector 4 may include different angled point sensors to determine when an aircraft enters the monitored region and is about to land or take-off. In response to the activation signal, the tracking sensor system 6 exposes the sensor 3 to track the aircraft. Use of the proximity detector 4 allows the sensor 3 to be sealed in a housing when not in use and protected from damaging environmental conditions, such as hailstorms and blizzards or fuel. The sensor 3 is only exposed to the environment for a short duration whilst an aircraft is in the vicinity of the sensor 3. If the tracking system 6 is used in conditions where the sensor 3 can be permanently exposed to the environment or the sensor 3 can resist the operating conditions, then the proximity detector 4 may not be required. The activation signal generated by the proximity detector 4 can also be used to cause the instrument rack 11 and the central control system 13 to adjust the bandwidth allocated on the link 15 so as to provide an adequate data transfer rate for transmission of video signals from the runway module to the central system 13. If the bandwidth is fixed at an acceptable rate or the system 2 only uses local area network communications and only requires a reduced bandwidth, then again the proximity detector 4 may not be required.

The tracking sensor system 6 includes one or more tracking or detection cameras 3 which obtain images of an aircraft as it approaches or leaves a runway. From a simple image of the aircraft, aspect ratios, such as the ratio of the wingspan to the fuselage length can be obtained. The tracking camera 3 used is a thermal camera which monitors thermal radiation received in the 10 to 14 $\mu$m wavelength range and is not dependent on lighting conditions for satisfactory operation. Use of the thermal cameras is also advantageous as distribution of temperatures over the observed surfaces of an aircraft can be obtained, together with signatures of engine exhaust emissions and features in the fuselage or engines. The tracking camera 3 can obtain an instantaneous two-dimensional image $I_n$ using all of the sensors in a CCD array of the camera, or alternatively one row of the array perpendicular to the direction of motion of the aircraft can be used to obtain a linear image at each scan and the linear image is then used to build up a two-dimensional image $I_n$ for subsequent processing.

Figure 6A:
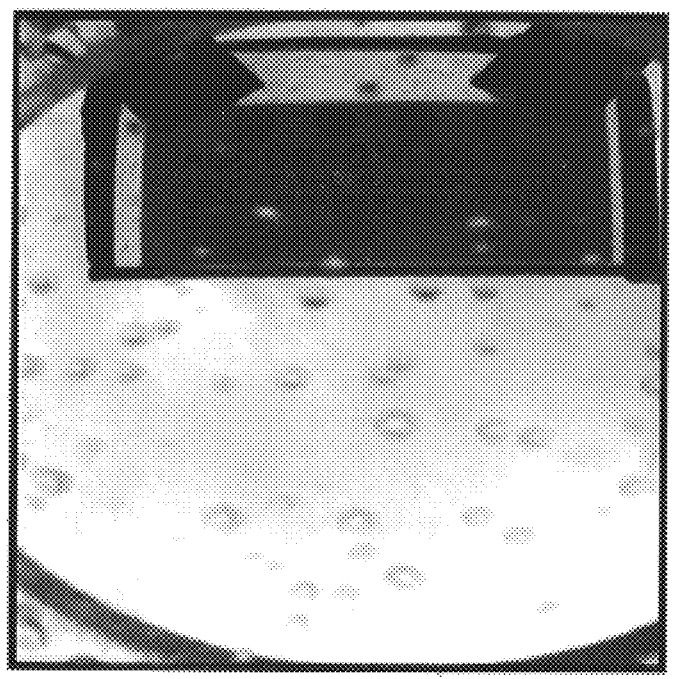
FIGS. 6(a) and 6(b) are underneath views of discs of sensors of the tracking system.
Figure 6B:

To allow operation of the tracking and acquisition cameras 3 and 7 in rain, a rotating disc system is employed. The use of a rotating disc for removing water drops from windows is used on marine vessels. A reflective or transparent disc is rotated at high speed in front of the window that is to be kept clear. Water droplets falling on the disk experience a large shear force related to the rotation velocity. The shear force is sufficient to atomise the water drop, thereby removing it from the surface of the disc. A transparent disc of approximate diameter 200 mm is mounted to an electric motor and rotated to a frequency of 60 Hz. A camera with a 4.8 mm focal length lens was placed below a glass window which in turn was beneath the rotating disc. The results of inserting the rotating disc are illustrated in FIG. 6(a), which shows the surface of a camera housing without the rotating disc, and in FIG. 6(b), which shows the surface of a camera housing with the rotating disc activated and in rain conditions.

Figure 7:
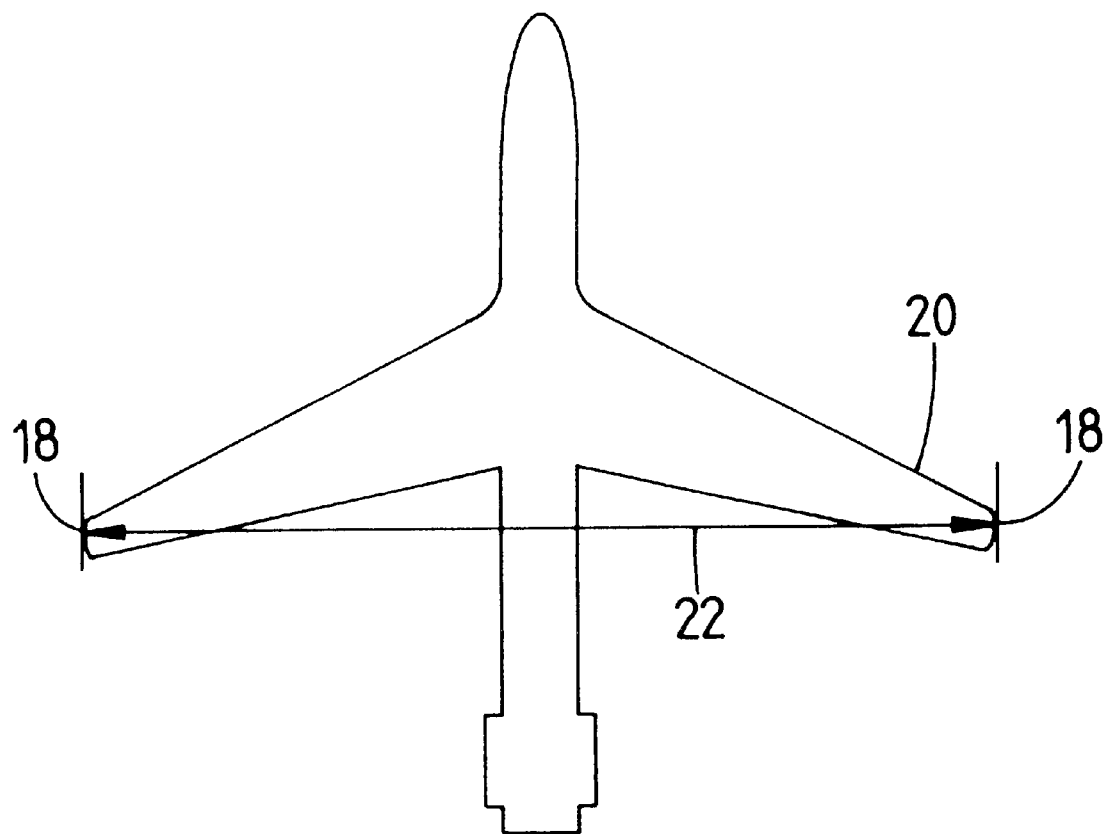
FIG. 7 is a schematic diagram of an image obtained by the tracking system.

The image processing system 8 processes the digital images provided by the tracking sensor system 6 so as to extract in real-time information concerning the features and movement of the aircraft. The images provided to the image processing system, depending on the tracking cameras employed, provide an underneath view of the aircraft, as shown in FIG. 7. The tips of the wings or wingspan points 18 of the aircraft are tracked by the image processor system 8 to determine when the image acquisition system 10 should be activated so as to obtain the best image of the registration markings on the port wing 20 of the aircraft. The image processing system 8 generates an acquisition signal using a trigger logic circuit 39 to trigger the camera of the image acquisition system 10. The image processing system 8 also determines and stores data concerning the wingspan 22 of the aircraft and other details concerning the size, shape and ICAO category (A to G) of the aircraft. The image processing system 8 classifies the aircraft on the basis of the size which can be used subsequently when determining the registration markings on the port wing 20. The data obtained can also be used for evaluation of the aircraft during landing and/or take-off.

Alternatively a pyroelectric sensor 27 can be used with a signal processing wing detection unit 29 to provide a tracking system 1 which also generates the acquisition signal using the trigger logic circuit 39, as shown in FIG. 4 and described later.

Detecting moving aircraft in the field of view of the sensor 3 or 27 is based on forming a profile or signature of the aircraft, P(y,t), that depends on a spatial coordinate y and time t. To eliminate features in the field of view that are secondary or slowly moving, a difference profile ΔP(y,t) is formed. The profile or signature can be differenced in time or in space because these differences are equivalent for moving objects. If the intensity of the light or thermal radiation from the object is not changing then the time derivative of the profile obtained from this radiation is zero. A time derivative of a moving field can be written as a convective derivative involving partial derivatives, which gives the equation $$\frac{dP(y,t)}{dt} = \frac{\partial P(y,t)}{\partial t} + v\frac{\partial P(y,t)}{\partial y} = 0 \qquad (3)$$

where v is the speed of the object as observed in the profile. After rearranging equation (3), gives $$\frac{\partial P(y,t)}{\partial t} = -v\frac{\partial P(y,t)}{\partial y} \qquad (4)$$

which shows that the difference in the profile in time is equivalent to the difference in the profile in space. This only holds for moving objects, when v≠0. Equation (4) also follows from the simple fact that if the profile has a given value $P(y_0,t_0)$ at the coordinate $(y_0,t_0)$, then it will have this same value along the line $$y = y_0 + v(t-t_0) \qquad (5)$$

To detect and locate a moving feature that forms an extremum in the profile, such as an aircraft wing, the profile can be differenced in space $\Delta_y P(y,t)$. Then an extremum in the profile P(y,t) will correspond to a point where the difference profile $\Delta_y P(y,t)$ crosses zero.

In one method for detecting a feature on the aircraft, a profile P(y,t) is formed and a difference profile $\Delta_t(y,t)$ is obtained by differencing in time, as described below. According to equation (4) this is equivalent to a profile of a moving object that is differenced in space. Therefore the position $y_p$ of the zero crossing point of $\Delta_t P(y,t)$ at time t is also the position of the zero crossing point of $\Delta_y P(y,t)$ which locates an extremum in P(y,t).

In another method for detecting a feature on the aircraft, the difference between the radiation received by a sensor 27 from two points in space is obtained as a function of time, $\Delta_y S(t)$, as described below. If there are no moving features in the field of view, then the difference is constant. If any object in the field of view is moving, then the position of a point on the object is related to time using equation (5). This allows a profile or signature differenced in space to be constructed $$\Delta_y P(y(t),t) = \Delta_y S(t) \qquad (6)$$

and, as described above, allows an extremum corresponding to an aircraft wing to be located in the profile from the zero crossing point in the differential signature.

The image acquisition system 10 includes at least one high resolution camera 7 to obtain images of the aircraft when triggered. The images are of sufficient resolution to enable automatic character recognition of the registration code on the port wing 20 or elsewhere. The illumination unit 16 is also triggered simultaneously to provide illumination of the aircraft during adverse lighting conditions, such as at night or during inclement weather.

The acquired images are passed to the analysis system 12 which performs Optical Character Recognition (OCR) on the images to obtain the registration code. The registration code corresponds to aircraft type and therefore the aircraft classification determined by the image processing system 8 can be used to assist to the recognition process, particularly when characters of the code are obscured in an acquired image. The registration code extracted and any other information concerning the aircraft can be then passed to other systems via a network connection 24.

Once signals received from the pyroelectric sensors 21 indicate the aircraft 28 is within the field of view of the sensors 3 of the tracking sensor system 6, the tracking system 1 is activated by the proximity detector 4. The proximity detector 4 is usually the first stage detection system to determine when the aircraft is in the proximity of the more precise tracking system 1 The tracking system 1 includes the tracking sensor system 6 and the image processing system 8 and according to one embodiment the images from the detection cameras 3 of the sensor system 5 are used by the image processing system 8 to provide a trigger for the image acquisition system when some point in the image of the aircraft reaches a predetermined pixel position. One or more detection cameras 3 are placed in appropriate locations near the airport runway such that the aircraft passes within the field of view of the cameras 3. A tracking camera 3 provides a sequence of images ($I_n$). The Image processing system 8 subtracts a background image from each image $I_n$ of the sequence. The background image represents an average of a number of preceding images. This yields an image $\Delta I_n$ that contains only those objects that have moved during the time interval between images. The image $\Delta I_n$ is thresholded at appropriate values to yield a binary image, i.e. one that contains only two levels of brightness, such that the pixels comprising the edges of the aircraft are clearly distinguishable. The pixels at the extremes of the aircraft in the direction perpendicular to the motion of the aircraft will correspond to the edges 18 of the wings of the aircraft. After further processing, described below, when it is determined the pixels comprising the port edge pass a certain position in the image corresponding to the acquisition point, the acquisition system 10 is triggered, thereby obtaining an image of the registration code beneath the wing 20 of the aircraft.

Imaging the aircraft using thermal infrared wavelengths and detecting the aircraft by its thermal radiation renders the aircraft self-luminous so that it can be imaged both during the day and night primarily without supplementary illumination. Infrared (IR) detectors are classified as either photon detectors (termed cooled sensors herein), or thermal detectors (termed uncooled sensors herein). Photon detectors (photoconductors or photodiodes) produce an electrical response directly as the result of absorbing IR radiation. These detectors are very sensitive, but are subject to noise due to ambient operating temperatures. It is usually necessary to cryogenically cool (80° K.) these detectors to maintain high sensitivity. Thermal detectors experience a temperature change when they absorb IR radiation, and an electrical response results from temperature dependence of the material property. Thermal detectors are not generally as sensitive as photon detectors, but perform well at room temperature.

Typically, cooled sensing devices formed from Mercury Cadmium Telluride offer far greater sensitivity than uncooled devices, which may be formed from Barium Strontium Titanate. Their Net Equivalent Temperature Difference (NETD) is also superior. However, with the uncooled sensor a chopper can be used to provide temporal modulation of the scene. This permits AC coupling of the output of each pixel to remove the average background. This minimises the dynamic range requirements for the processing electronics and amplifies only the temperature differences. This is an advantage for resolving differences between clouds, the sun, the aircraft and the background. The advantage of differentiation between objects is that it reduces the load on subsequent image processing tasks for segmenting the aircraft from the background and other moving objects such as the clouds.

Figure 8:
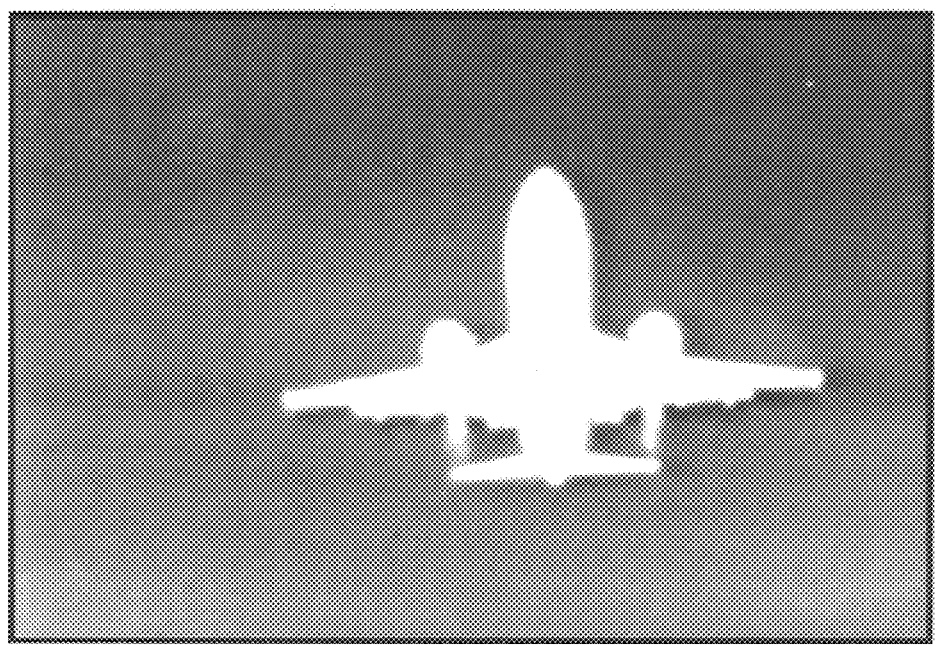
FIGS. 8 and 9 are images obtained from a first embodiment of the tracking system.
Figure 9:
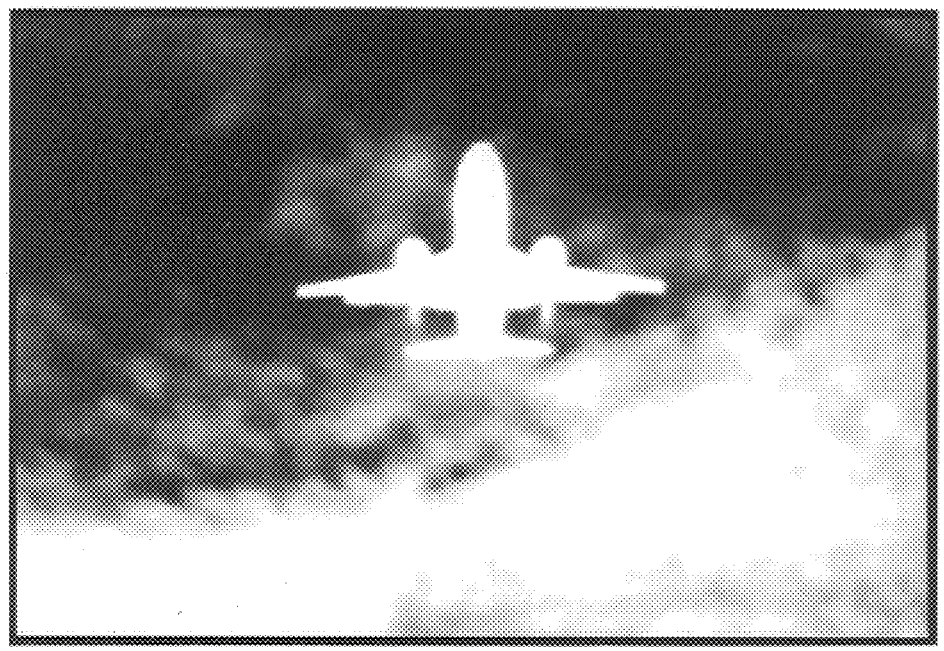

Both a cooled and uncooled thermal infrared imaging system 6 has been used during day, night and foggy conditions. The system 6 produced consistent images of the aircraft in all these conditions, as shown in FIGS. 8 and 9. In particular, the sun in the field of view produced no saturation artifacts or flaring in the lens. At night, the entire aircraft was observable, not just the lights.

The image processing system 8 uses a background subtraction method in an attempt to eliminate slowly moving or stationary objects from the image, leaving only the fast moving objects. This is achieved by maintaining a background image that is updated after a certain time interval elapses. The update is an incremental one based on the difference between the current image and the background. The incremental change is such that the background image can adapt to small intensity variations in the scene but takes some time to respond to large variations. The background image is subtracted from the current image, a modulus is taken and a threshold applied. The result is a binary image containing only those differences from the background that exceed the threshold.

One problem with this method is that some slow moving features, such as clouds, still appear in the binary image. The reason for this is that the method does not select on velocity but on a combination of velocity and intensity gradients. If the intensity in the image is represented by I(x,y,t), where x and y represent the position in rows and columns, respectively, and t represents the image frame number (time) and if the variation in the intensity due to ambient conditions is very small then it can be shown that the time variation of the intensity in the image due to a feature moving with velocity v is given by $$\frac{\partial I(x, y, t)}{\partial t} = -v \cdot \nabla I(x, y, t) \tag{7}$$

In practice, the time derivative in equation (7) is performed by taking the difference between the intensity at (x,y) at different times. Equation (7) shows that the value of this difference depends on the velocity v of the feature at (x,y) and the intensity gradient. Thus a fast moving feature with low contrast relative to the background is identical to a slow moving feature with a large contrast. This is the situation with slowly moving clouds that often have very bright edges and therefore large intensity gradients there, and are not eliminated by this method. Since features in a binary image have the same intensity gradients, better velocity selection is obtained using the same method but applied to the binary image. In this sense, the background-subtraction method is applied twice, once to the original grey-scale image to produce a binary image as described above, and again to the subsequent binary image, as described below.

Figure 10:
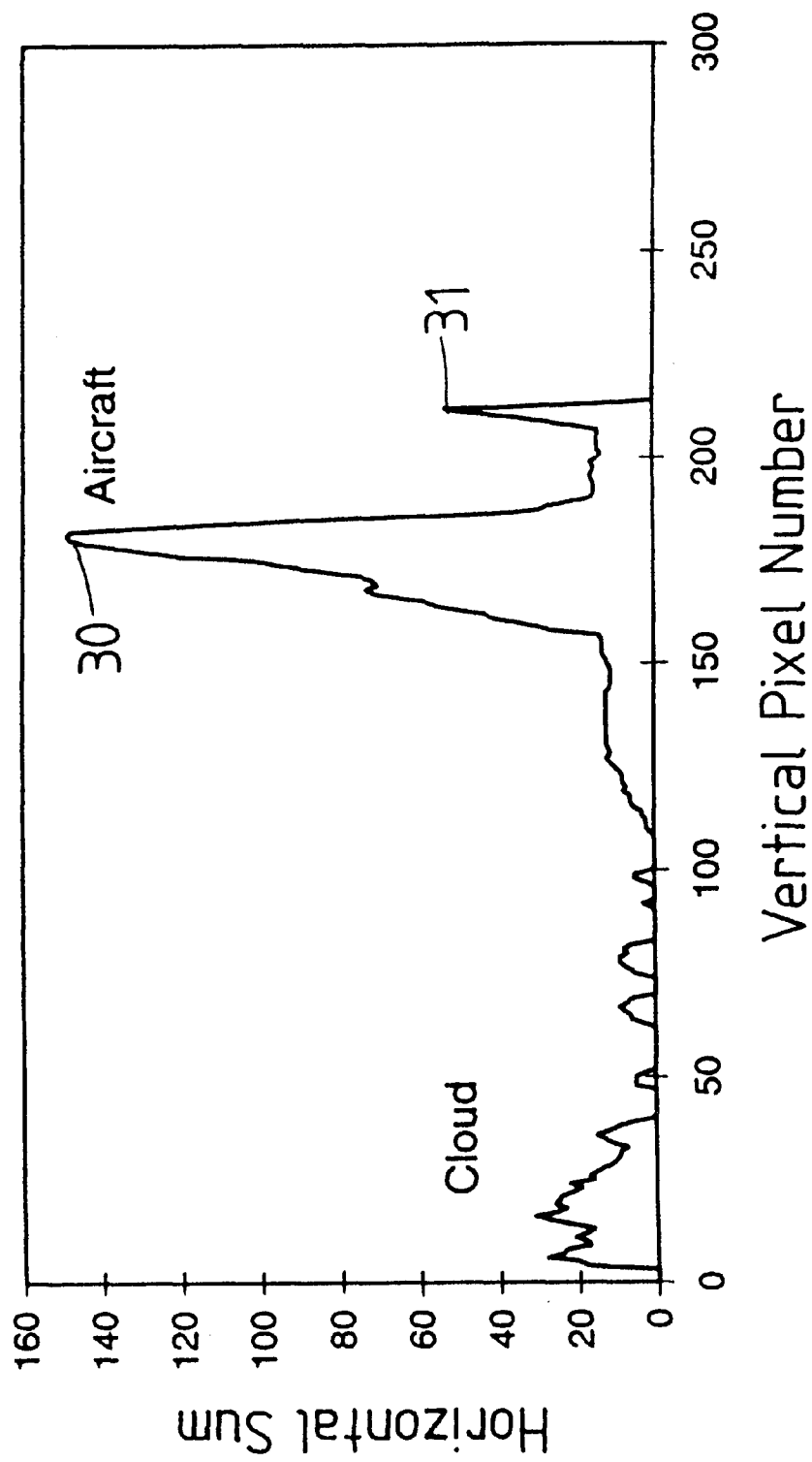
FIG. 10 is a graph of a pixel row sum profile for an image obtained by the tracking system.

The output from the initial image processing hardware is a binary image B(x,y,t) where B(x,y,t)=1 if a feature is located at (x,y) at time t, and B(x,y,t)=0 represents the background. Within this image the fast moving features belong to the aircraft. To deduce the aircraft wing position the two-dimensional binary image can be compressed into one dimension by summing along each pixel row of the binary image, $$P(y,t) = \int B(x,y,t) dx \tag{8}$$

where the aircraft image moves in the direction of the image columns. This row-sum profile is easily analysed in real time to determine the location of the aircraft. An example of a profile is shown in FIG. 10 where the two peaks 30 and 31 of the aircraft profile correspond to the main wings (large peak 30) and the tail wings (smaller peak 31).

Figure 11:
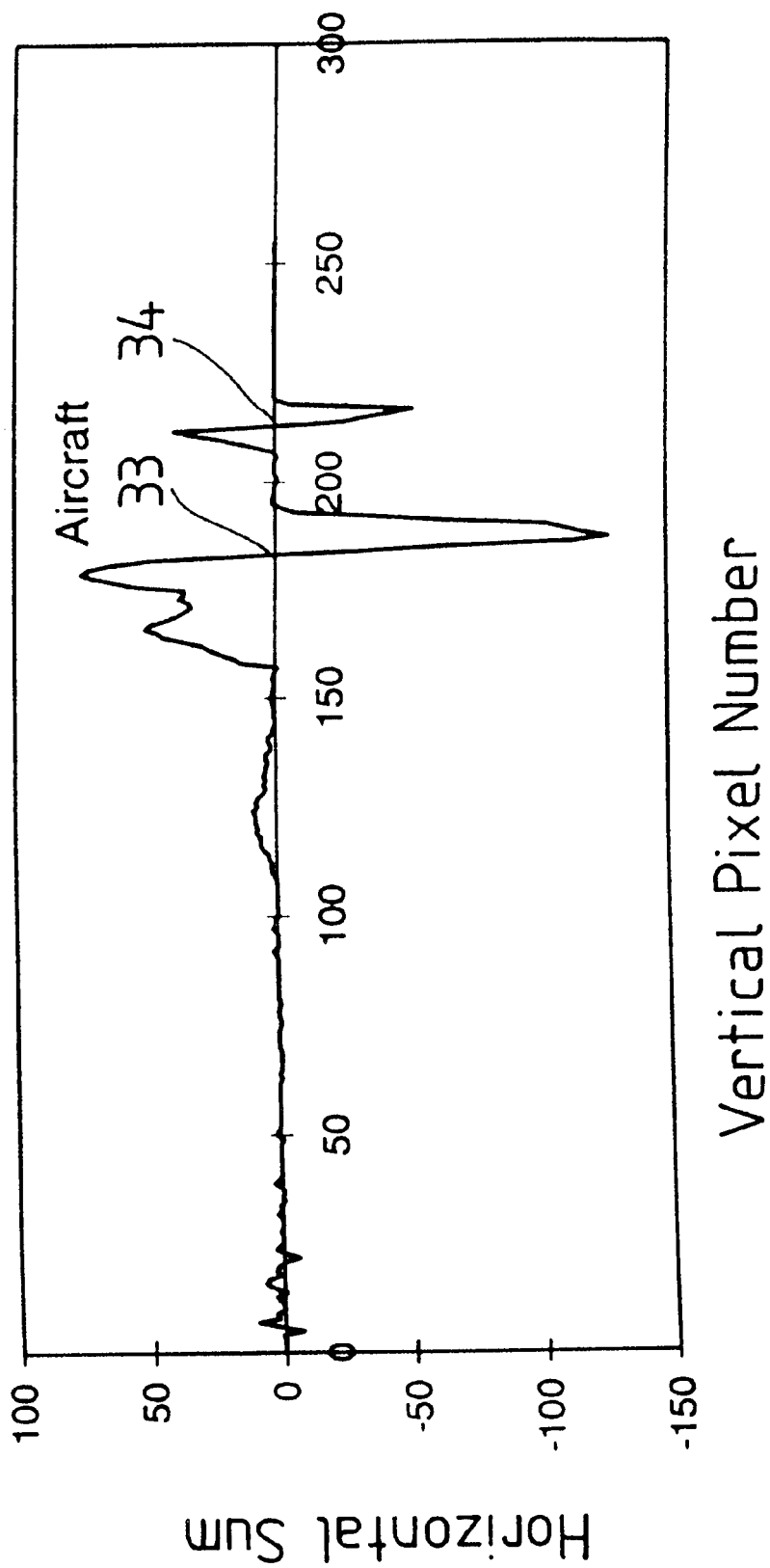
FIG. 11 is a graph of a difference profile obtained by subtracting successive row sum profiles.

In general, there are other features present, such as clouds, that must be identified or filtered from the profile. To do this, differences between profiles from successive frames are taken, which is equivalent to a time derivative of the profile. Letting A(x,y,t) be the aircraft where A(x,y,t)=1 if (x,y) lies within the aircraft and 0 otherwise and letting C(x,y,t) represent clouds or other slowly moving objects, then it can be shown that the time derivative of the profile is given by $$\frac{\partial P(y, t)}{\partial t} = \int \frac{\partial A(x, y, t)}{\partial t} dx + \int \frac{\partial C(x, y, t)}{\partial t} dx - \int \frac{\partial}{\partial t} [A(x, y, t) C(x, y, t)] dx \tag{9}$$

$$= \int \frac{\partial A(x, y, t)}{\partial t}[1 - C(x, y, t)]dx + \varepsilon(C)$$

where $\varepsilon(C) \approx 0$ is a small error term due to the small velocity of the clouds. Equation (9) demonstrates an obvious fact that the time derivative of a profile gives information on the changes (such as motion) of feature A only when the changes in A do not overlap features C. In order to obtain the best measure of the location of a feature, the overlap between features must be minimised. This means that C(x,y,t) must cover as small an area as possible. If the clouds are present but do not overlap the aircraft, then apart from a small error term, the time difference between profiles gives the motion of the aircraft. The difference profile corresponding to FIG. 10 is shown in FIG. 11 where the slow moving clouds have been eliminated. The wing positions occur at the zero-crossing points 33 and 34. Note that the clouds have been removed, apart from small error terms.

The method is implemented using a programmable logic circuit of the image processing system 8 which is programmed to perform the row sums on the binary image and to output these as a set of integers after each video field. When taking the difference between successive profiles the best results were obtained using differences between like fields of the video image, i.e. even-even and odd-odd fields.

The difference profile is analysed to locate valid zero crossing points corresponding to the aircraft wing positions. A valid zero crossing is one in which the difference profile initially rises above a threshold $I_T$ for a minimum distance $Y_T$ and falls through zero to below $-I_T$ for a minimum distance $y_T$. The magnitude of the threshold $I_T$ is chosen to be greater than the error term $\varepsilon(C)$ which is done to discount the affect produced by slow moving features, such as clouds.

In addition, the peak value of the profile, corresponding to the aircraft wing, can be obtained by summing the difference values when they are valid up to the zero crossing point. This method removes the contributions to the peak from the non-overlapping clouds. It can be used as a guide to the wing span of the aircraft.

Figure 12:
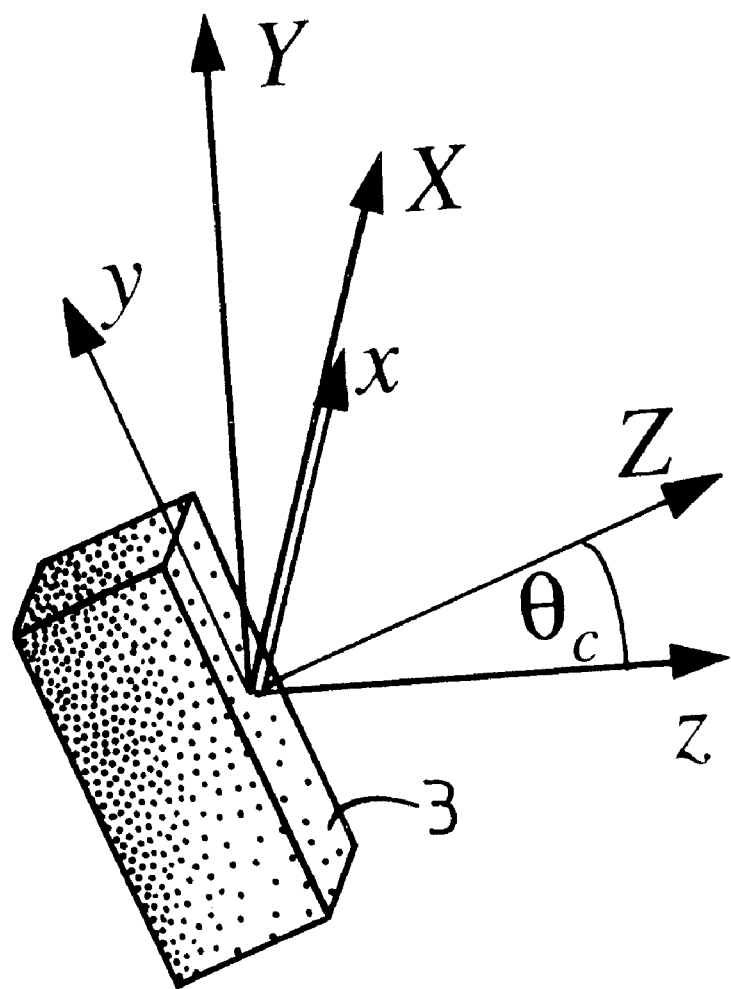
FIG. 12 is a diagram of a coordinate system for images obtained by the tracking system.
Figure 13:
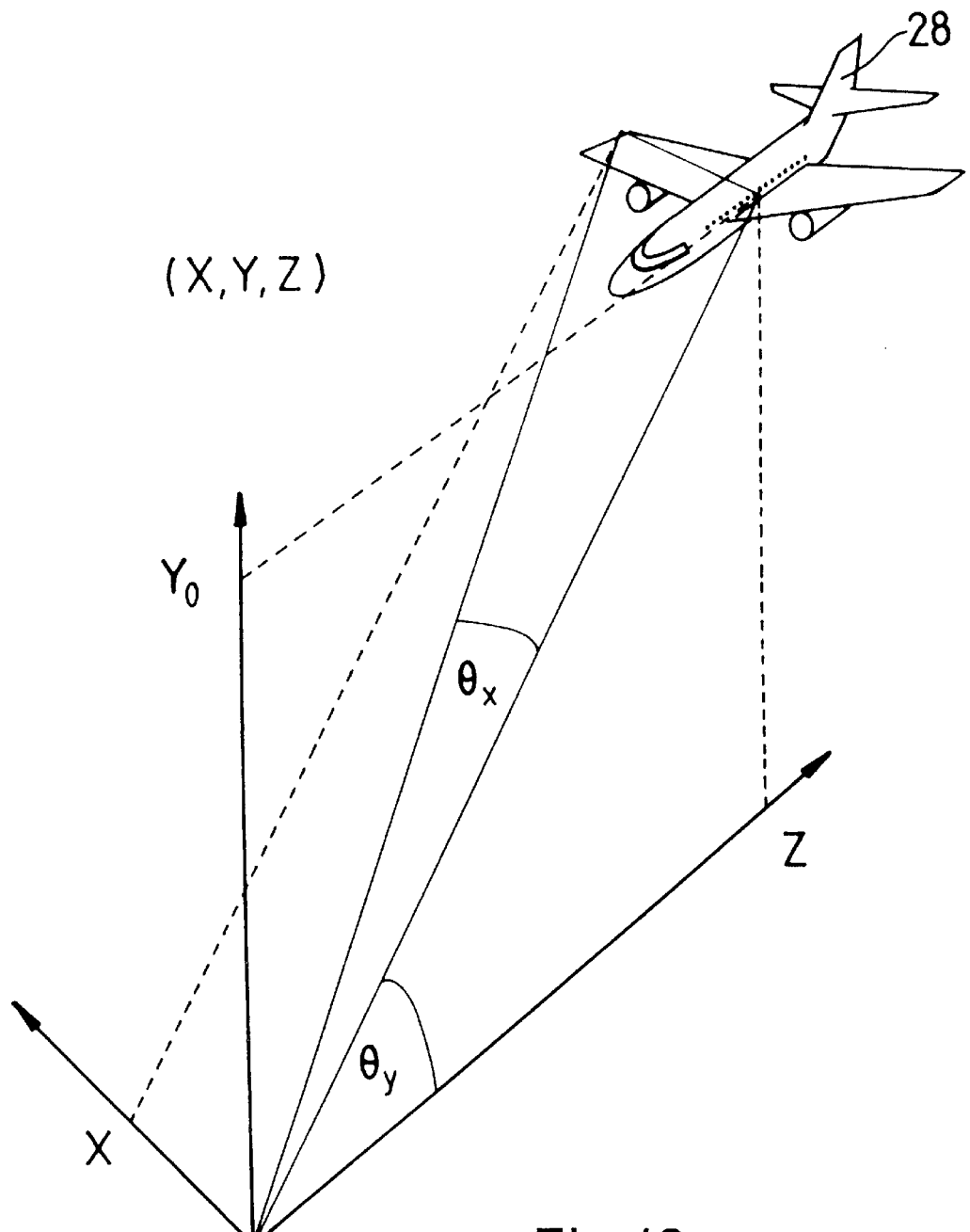
FIG. 13 is a diagram of a coordinate system for the aircraft used for geometric correction of the images obtained by the tracking system.

The changes in position of the aircraft in the row-sum profile are used to determine a velocity for the aircraft that can be used for determining the image acquisition or trigger time, even if the aircraft is not in view. This situation may occur if the aircraft image moves into a region on the sensor that is saturated, or if the trigger point is not in the field of view of the camera 3. However, to obtain a reliable estimate of the velocity, geometric corrections to the aircraft position are required to account for the distortions in the image introduced by the camera lens. These are described below using the coordinate systems (x,y,z) for the image and (X,Y,Z) for the aircraft as shown in FIGS. 12 and 13, respectively.

For an aircraft at distance Z and at a constant altitude $Y_0$, the angle from the horizontal to the aircraft in the vertical plane is $$\tan \theta_y = Y_0/Z \qquad (10)$$

Since $Y_0$ is approximately constant, a normalised variable $Z_N = Z/Y_0$ can be used. If $y_0$ is the coordinate of the centre of the images, f is the focal length of the lens and $\theta_c$ is the angle of the camera from the horizontal in the vertical plane, then $$\frac{y_0 - y}{f} = \tan(\theta_y - \theta_c) = \frac{\tan \theta_y - \tan \theta_c}{1 + \tan \theta_y \tan \theta_c} \qquad (11)$$

where the tangent has been expanded using a standard trigonometric identity. Using (10) and (11) an expression for the normalised distance $Z_N$ is obtained $$Z_N(y) = \frac{1 + \beta(y - y_0)\tan \theta_c}{\tan \theta_c - \beta(y - y_0)} \qquad (12)$$

where $\beta = 1/f$. This equation allows a point in the image at y to be mapped onto a true distance scale, $Z_N$. Since the aircraft altitude is unknown, the actual distance cannot be determined. Instead, all points in the image profile are scaled to be equivalent to a specific point, $y_1$, in the profile. This point is chosen to be the trigger line or image acquisition line. The change in the normalised distance $Z_N(y_1)$ at $y_1$ due to an increment in pixel value $\Delta y_1$ is $\Delta Z_N(y_1) = Z_N(y_1 + \Delta y_1) - Z_N(y_1)$ The number of such increments over a distance $Z_N(y_2) - Z_N(y_1)$ is $M = (Z_N(y_2) - Z_N(y_1))/\Delta Z_N(y_1)$ Thus the geometrically corrected pixel position at $Y_2$ is $$y_{c2} = y_1 + M\Delta y_1 = y_1 + \frac{Z_N(y_2) - Z_N(y_1)}{\Delta Z_N(y_1)}\Delta y_1 \qquad (13)$$

For an aircraft at distance Z and at altitude $Y_0$, a length X on it in the X direction subtends an angle in the horizontal plane of $$\tan \theta_x = \frac{X}{\sqrt{Y_0^2 + Z^2}} = \frac{X_N}{\sqrt{1 + Z_N^2}} \qquad (14)$$

where normalised values have been used. If $x_0$ is the location of the centre of the image and f is the focal length of the lens, then $$\frac{x - x_0}{f} = \tan \theta_x \qquad (15)$$

Using (12), (14) and (15), the normalised distance $X_N$ can be obtained in terms of x and y $$X_N = \frac{(x - x_0)}{f}\sqrt{1 + Z_N^2(y)} \qquad (16)$$

As with the y coordinate, the x coordinate is corrected to a value at $y_1$. Since $X_N$ should be independent of position, then a length $x_2 - x_0$ at $y_2$ has a geometrically corrected length of $$\begin{aligned}x_{c2} - x_0 &= (x_2 - x_0)\frac{\sqrt{1 + Z_N^2(y_2)}}{\sqrt{1 + Z_N^2(y_1)}} \\ &= (x_2 - x_0)\frac{\sqrt{1 + \beta^2(y_2 - y_0)^2}}{\sin \theta_c - \beta(y_2 - y_0)\cos \theta_c} \cdot \frac{\sin \theta_c - \beta(y_1 - y_0)\cos \theta_c}{\sqrt{1 + \beta^2(y_1 - y_0)^2}}\end{aligned} \qquad (17)$$

The parameter $\beta = 1/f$ is chosen so that x and y are measured in terms of pixel numbers. If $y_0$ is the centre of the camera centre and it is equal to half the total number of pixels, and if $\theta_{FOV}$ is the vertical field of view of the camera, then $$\beta = \frac{\tan(\theta_{FOV}/2)}{y_0} \qquad (18)$$

This relation allows $\beta$ to be calculated without knowing the lens focal length and the dimensions of the sensor pixels.

The velocity of a feature is expressed in terms of the number of pixels moved between image fields (or frames). Then if the position of the feature in frame n is $y_n$, the velocity is given by $v_n = y_n - y_{n-1}$. Over N frames, the average velocity is then $$\langle v \rangle = \frac{1}{N}\sum_{n=1}^{N} v_n = \frac{1}{N}\sum_{n=1}^{N}(y_n - y_{n-1}) = \frac{1}{N}(y_N - y_0) \qquad (19)$$

which depends only on the start and finish points of the data. This is sensitive to errors in the first and last values and takes no account of the positions in between. The error in the velocity due to an error $\delta y_N$ in the value $y_N$ is $$\varepsilon(\langle v \rangle) = \frac{\delta y_N}{N} \qquad (20)$$

A better method of velocity estimation uses all the position data obtained between these values. A time t is maintained which represents the current frame number. Then the current position is given by $$y = y_0 - vt \qquad (21)$$

where $y_0$ is the unknown starting point and v is the unknown velocity. The number n of valid positions $y_n$ measured from the feature are each measured at time $t_n$. Minimising the mean square error $$X^2 = \frac{1}{N}\sum_{n=1}^{N}(y_n - y_0 + vt_n)^2 \qquad (22)$$

with respect to v and $y_0$ gives two equations for the unknown quantities $y_0$ and v. Solving for v yields $$v = \frac{\sum_{n=1}^{N} y_n \sum_{n=1}^{N} t_n - N\sum_{n=1}^{N} y_n t_n}{N\sum_{n=1}^{N} t_n^2 - \sum_{n=1}^{N} t_n \sum_{n=1}^{N} t_n} \qquad (23)$$

This solution is more robust in the sense that it takes account of all the motions of the feature, rather than the positions at the beginning and at the end of the observations. If the time is sequential, so that $t_n = n\Delta t$ where $t_n = 1$ is the time interval between image frames, then the error in the velocity due to an error $\delta y_n$ in the value $y_n$ is $$\varepsilon(\langle v \rangle) = \frac{\delta y_n}{N}\left\{\frac{6(N+1-2n)}{(N+1)(N-1)}\right\} \qquad (24)$$

which, for the same error $\delta y_N$ in (19), gives a smaller error than (21) for N>5. In general, the error in (24) varies as $1/N^2$ which is less sensitive to uncertainties in position than (19).

If the aircraft is not in view, then the measurement of the velocity v can be used to estimate the trigger time. If $y_I$ is the position of a feature on the aircraft that was last seen at a time $t_I$, then the position at any time t is estimated from $$y = y_I - v(t - t_I) \qquad (25)$$

Based on this estimate of position, the aircraft will cross the trigger point located at $y_T$ at a time $t_T$ estimated by $$t_T = t_I - \frac{y_T - y_I}{v} \qquad (26)$$

An alternative method of processing the images obtained by the camera 3 to determine the aircraft position, which also automatically accounts for geometric corrections, is described below. The method is able to predict the time for triggering the acquisition system 10 based on observations of the position of the aircraft 28.

Figure 14:
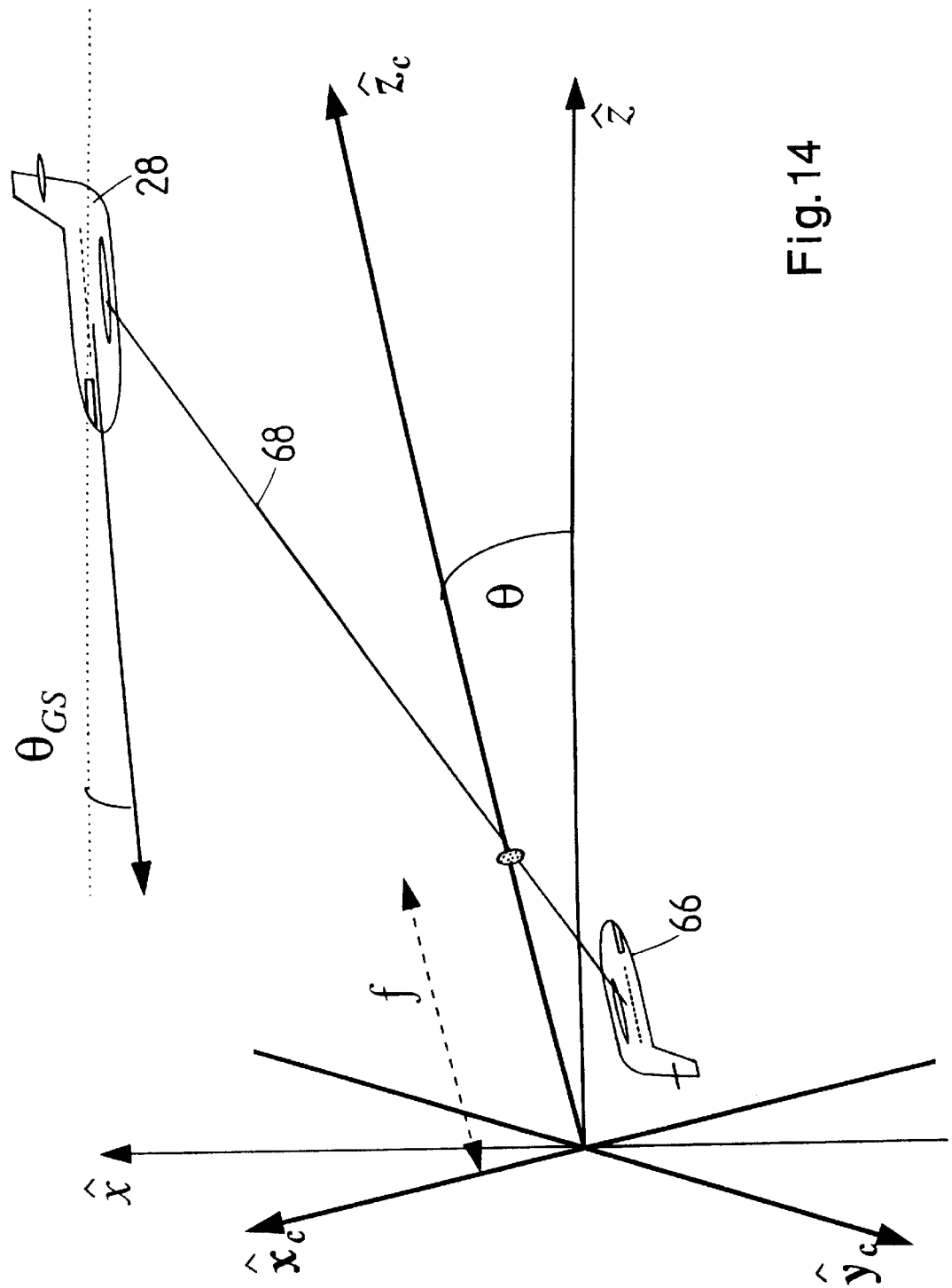
FIG. 14 is a diagram of a coordinate system used for predicting a time to generate an acquisition signal.

To describe the location of an aircraft 28 and its position, a set of coordinates are defined such that the $\hat{x}$ axis points vertically upwards, the $\hat{z}$ axis points horizontally along the runway towards the approaching aircraft, and $\hat{y}$ is horizontal and perpendicular to the runway. The image 66 of the aircraft is located in the digitised image by pixel values $(x_p, y_p)$, where $x_p$ is defined to be the vertical pixel value and $y_p$ the horizontal value. The lens on the camera inverts the image so that a light ray from the aircraft strikes the sensor at position $(-x_p, -y_p, 0)$, where the sensor is located at the coordinate origin. FIG. 14 shows a ray 68 from an object, such as a point on the aircraft, passing through a lens of a focal length f, and striking the imaging sensor at a point $(-x_p, -y_p)$, where $x_p$ and $y_p$ are the pixel values. The equation locating a point on the ray is given by $$r = x_p(z/f-1)\hat{x}_c + y_p(z/f-1)\hat{y}_c + z\hat{z}_c \qquad (27)$$

where z is the horizontal distance along the ray, and the subscript c refers to the camera coordinates. The camera axis $\hat{z}_c$ is collinear with the lens optical axis. It will be assumed that $z/f \gg 1$, which is usually the case.

Assuming the camera is aligned so that $\hat{y}_c = \hat{y}$ is aligned with the runway coordinate, but the camera is tilted from the horizontal by angle $\theta$. Then $$\hat{x}_c = \hat{x}\cos\theta - \hat{z}\sin\theta$$

$$\hat{z}_c = \hat{x}\sin\theta + \hat{z}\cos\theta \qquad (28)$$

and a point on the ray from the aircraft to its image is given by $$r = z[(x_p\cos\theta/f + \sin\theta)\hat{x} + (y_p/f)\hat{y} + (\cos\theta - x_p\sin\theta/f)\hat{z}] \qquad (29)$$

Letting the aircraft trajectory be given by $$r(t) = (z(t)\tan\theta_{GS} + x_0)\hat{x} + y_0\hat{y} + z(t)\hat{z} \qquad (30)$$

where z(t) is the horizontal position of the aircraft at time t, $\theta_{GS}$ is the glide-slope angle, and the aircraft is at altitude $x_0$ and has a lateral displacement $y_0$ at $z(t_0) = 0$. Here, $t = t_0$ is the time at which the image acquisition system 10 is triggered, i.e. when the aircraft is overhead with respect to the cameras 7.

Comparing equations (29) and (30) allows z to be written in terms of z(t) and gives the pixel positions as $$x_p(t) = f\left(\frac{z(t)[\cos\theta\tan\theta_{GS} - \sin\theta] + x_0\cos\theta}{z(t)[\sin\theta\tan\theta_{GS} + \cos\theta] + x_0\sin\theta}\right) \quad (31)$$

and $$y_p(t) = \frac{f y_0}{z(t)[\sin\theta\tan\theta_{GS} + \cos\theta] + x_0\sin\theta} \quad (32)$$

Since $z_p(t)$ is the vertical coordinate and its value controls the acquisition rigger, the following discussion will be centred on equation (31). The aircraft position is given by $$z(t) = v(t_0 - t) \quad (33)$$

where v is the speed of the aircraft along the $\hat{z}$ axis.

The aim is to determine $t_0$ from a series of values of $z_p(t)$ at t determined from the image of the aircraft. For this purpose, it is useful to rearrange (31) into the following form $$c - t + ax_p - btx_p = 0 \quad (34)$$

where $$a = \frac{vt_0(\tan\theta_{GS} + \cot\theta) + x}{fv(1 - \tan\theta_{GS}\cot\theta)} \quad (35)$$

$$b = \frac{\tan\theta_{GS} + \cot\theta}{f(1 - \tan\theta_{GS}\cot\theta)} \quad (36)$$

and $$c = t_0 - \frac{x_T x_0}{fv(1 - \tan\theta_{GS}\cot\theta)} \quad (37)$$

The pixel value corresponding to the trigger point vertically upwards is $X_T = f\cot\theta$. The trigger time, $t_0$, can be expressed in terms of the parameters a, b and c $$t_0 = \frac{c + ax_T}{1 + bx_T} \quad (38)$$

The parameters a, b and c are unknown since the aircraft glide slope, speed, altitude and the time at which the trigger is to occur are unknown. However, it is possible to estimate these using equation (34) by minimising the chi-square statistic. Essentially, equation (34) is a prediction of the relationship between the measured values $x_p$ and t, based on a simple model of the optical system of the detection camera 3 and the trajectory of the aircraft 28. The parameters a, b and c are to be chosen so as to minimise the error of the model fit to the data, i.e. make equation (34) be as close to zero as possible.

Let $x_n$ be the location of the aircraft in the image, i.e. pixel value, obtained at time t. Then the chi-square statistic is $$X^2 = \sum_{n=1}^{N}(c - t_n + ax_n - bt_nx_n)^2 \quad (39)$$

for N pairs of data points. The optimum values of the parameters are those that minimise the chi-square statistic, i.e. those that satisfy equation (34).

For convenience, the following symbols are defined $$X = \sum_{n=1}^{N} x_n, \quad T = \sum_{n=1}^{N} t_n, \quad P = \sum_{n=1}^{N} x_n t_n, \quad Y = \sum_{n=1}^{N} x_n^2, \quad (40)$$

$$Q = \sum_{n=1}^{N} x_n^2 t_n, \quad R = \sum_{n=1}^{N} x_n t_n^2, \quad S = \sum_{n=1}^{N} x_n^2 t_n^2.$$

Then the values of a, b and c that minimise equation (39) are given by $$a = \frac{(NP - XT)(P^2 - NS) - (NR - PT)(PX - NQ)}{(NY - X^2)(P^2 - NS) + (PX - NQ)^2} \quad (41)$$

$$b = \frac{(NP - XT)(PX - NQ) + (NR - PT)(NY - X^2)}{(NY - X^2)(P^2 - NS) + (PX - NQ)^2} \quad (42)$$

and $$c = \frac{T + bP - aX}{N} \quad (43)$$

On obtaining a, b and c from equations (41) to (43), then $t_0$ can be obtained from equation (38).

Figure 15:
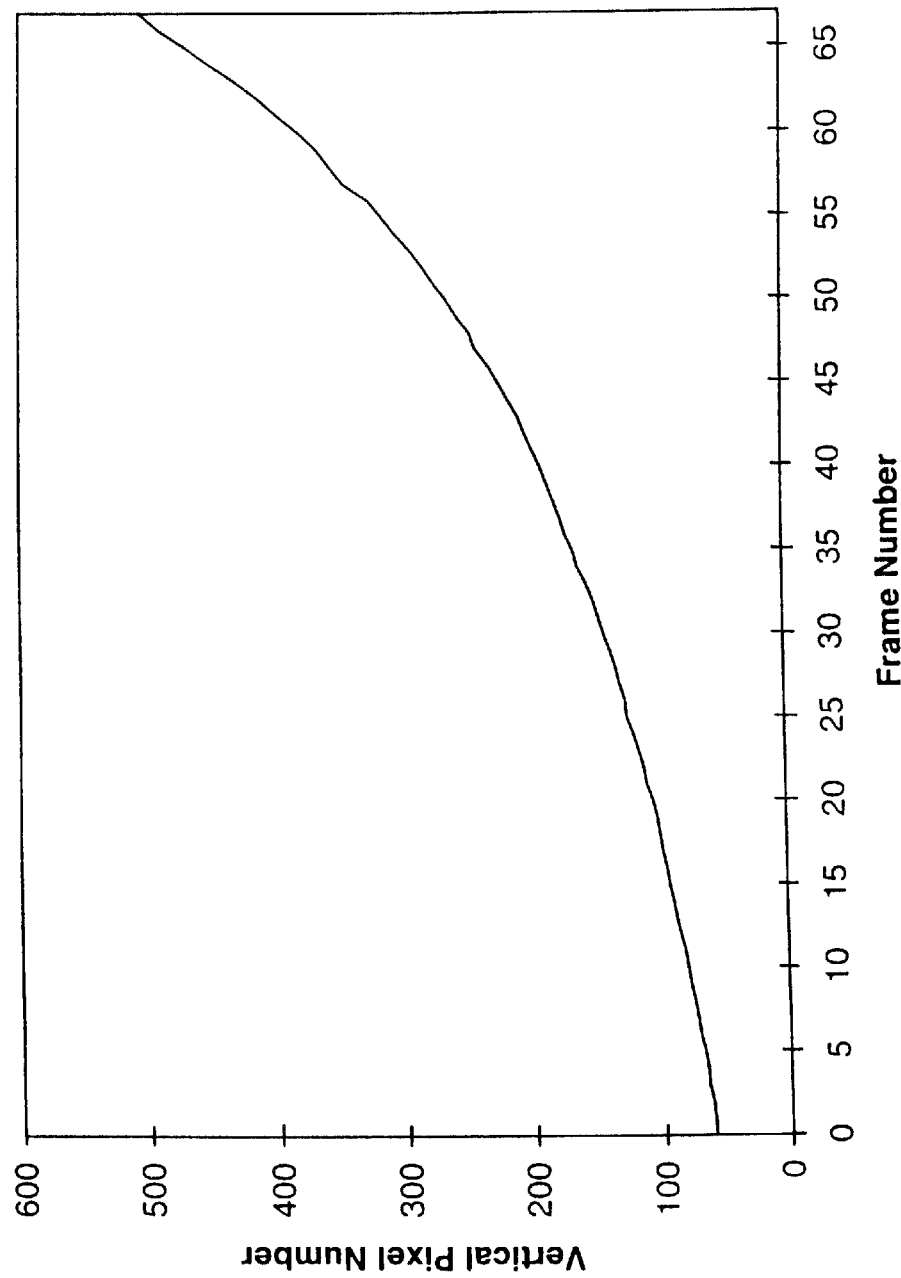
FIG. 15 is a graph of aircraft position in images obtained by the tracking system over successive frames.
Figure 16:
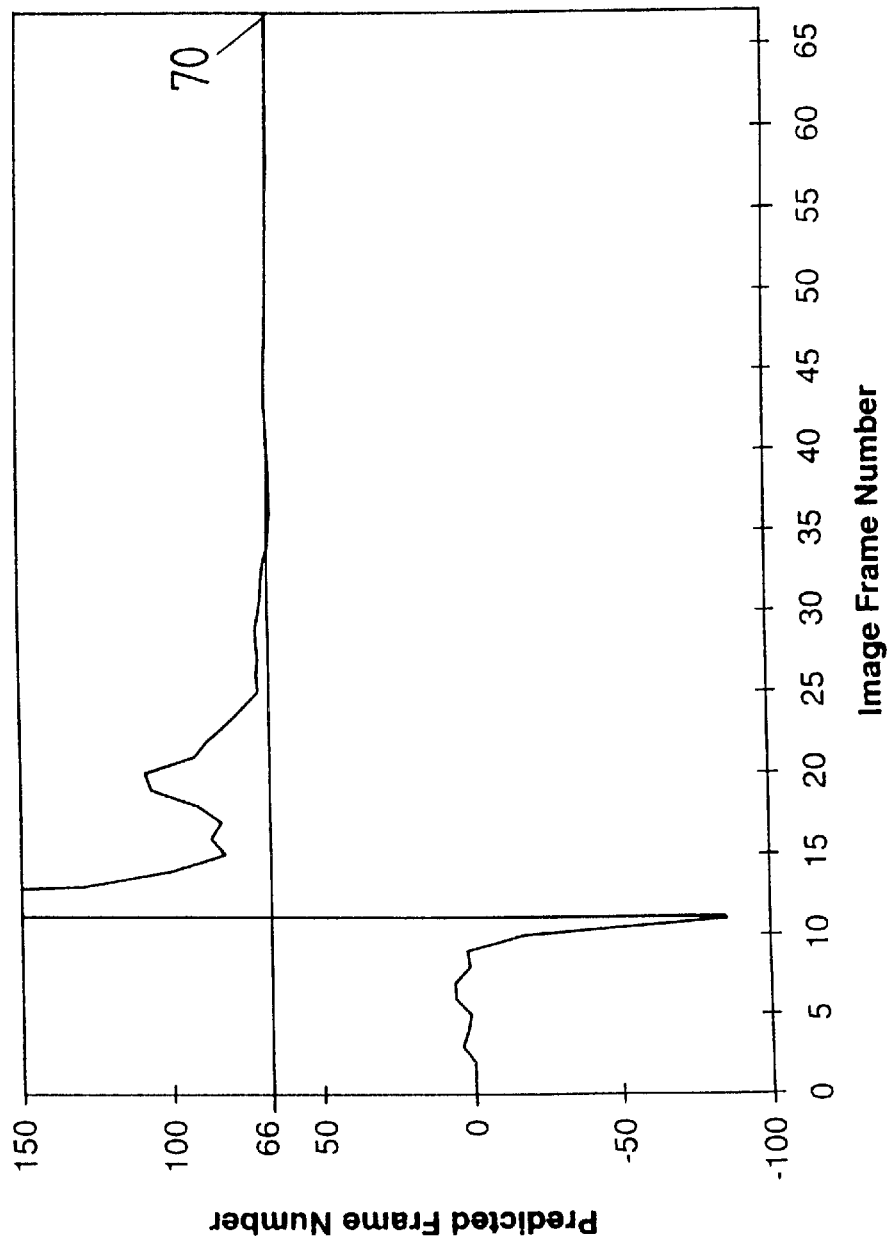
FIG. 16 is a graph of predicted trigger frame number over successive image frames obtained by the tracking system.

Using data obtained from video images of an aircraft landing at Melbourne airport, a graph of aircraft image position as a function of image frame number is shown in FIG. 15. The data was processed using equations (41) to (43) and (38) to yield the predicted value for the trigger frame number $t_0=66$ corresponding to trigger point 70. The predicted point 70 is shown in FIG. 16 as a function of frame number. The predicted value is to $=66\pm0.5$ after 34 frames. In this example, the aircraft can be out of the view of the camera 3 for up to 1.4 seconds and the system 2 can still trigger the acquisition camera 7 to within 40 milliseconds of the correct time. For an aircraft travelling at 62.5 m/s, the system 2 captures the aircraft to within 2.5 meters of the required position.

The tracking system 6, 8 may also use an Area-Parameter Accelerator (APA) digital processing unit, as discussed in International Publication No. WO 93/19441, to extract additional information, such as the aspect ratio of the wing span to the fuselage length of the aircraft and the location of the centre of the aircraft.

Figure 17:
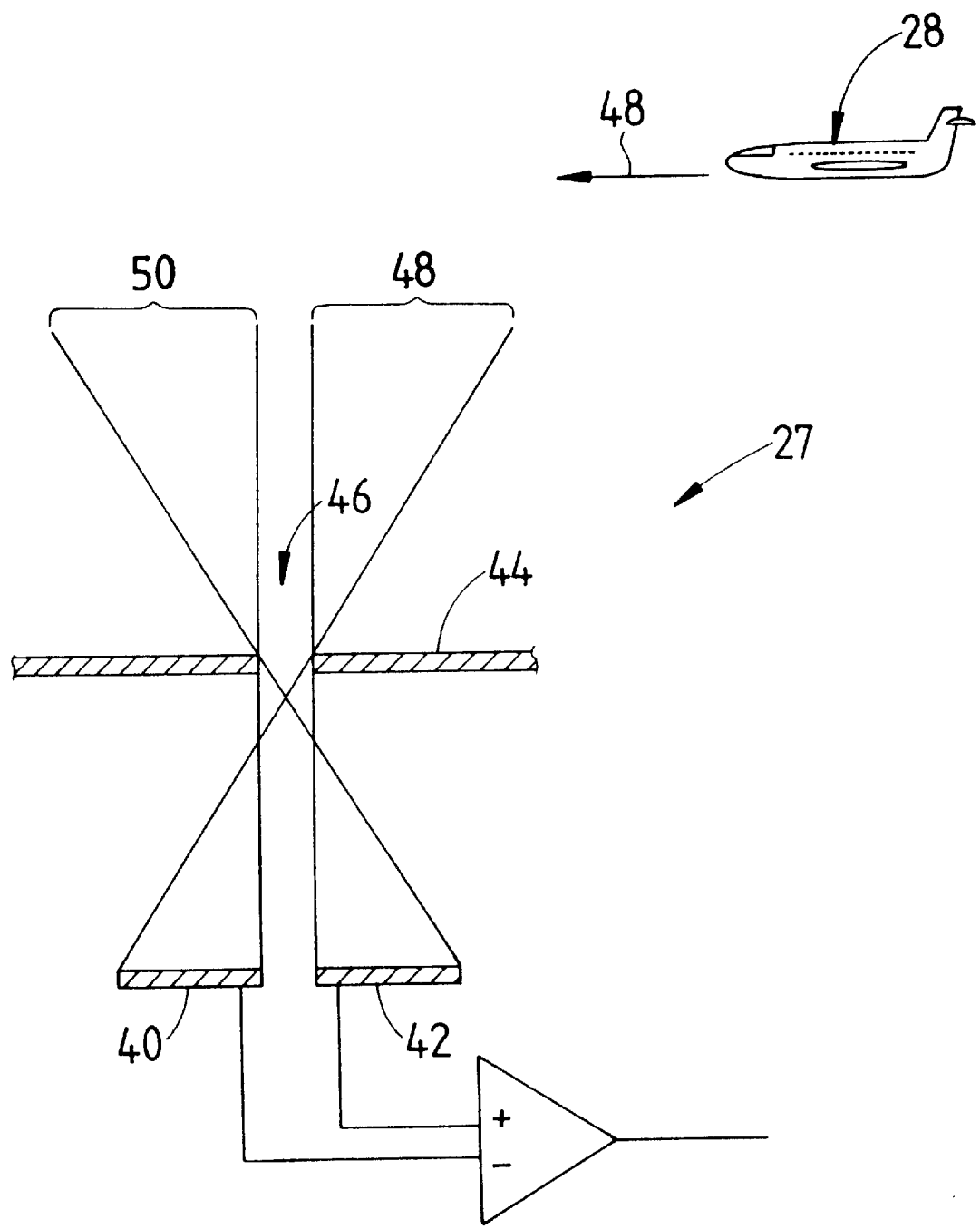
FIG. 17 is a schematic diagram of a pyroelectric sensor used in a second embodiment of the tracking system.
Figure 18A:
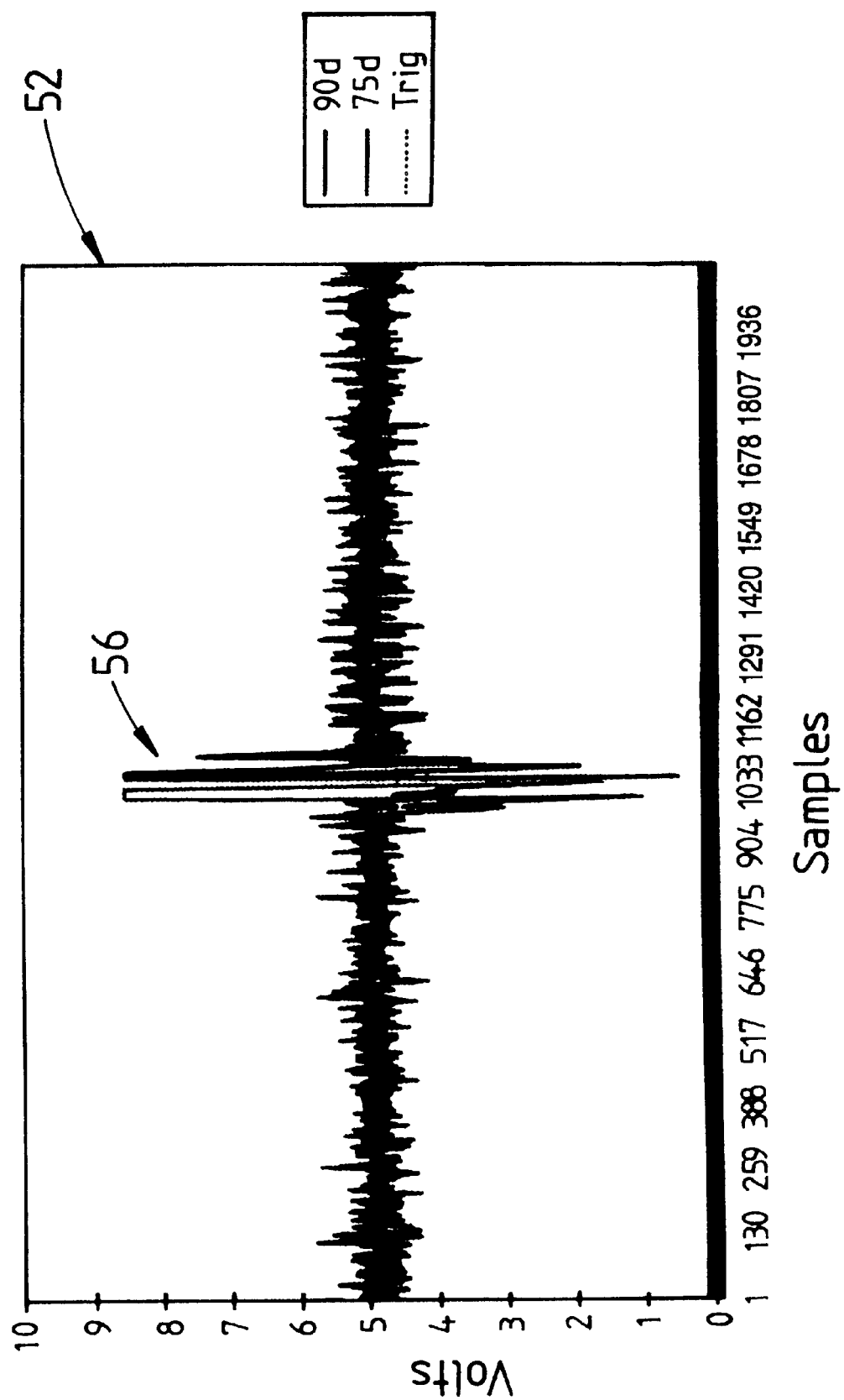
FIGS. 18a and 18b are graphs of differential signatures obtained using the second embodiment of the tracking system.
Figure 18B:
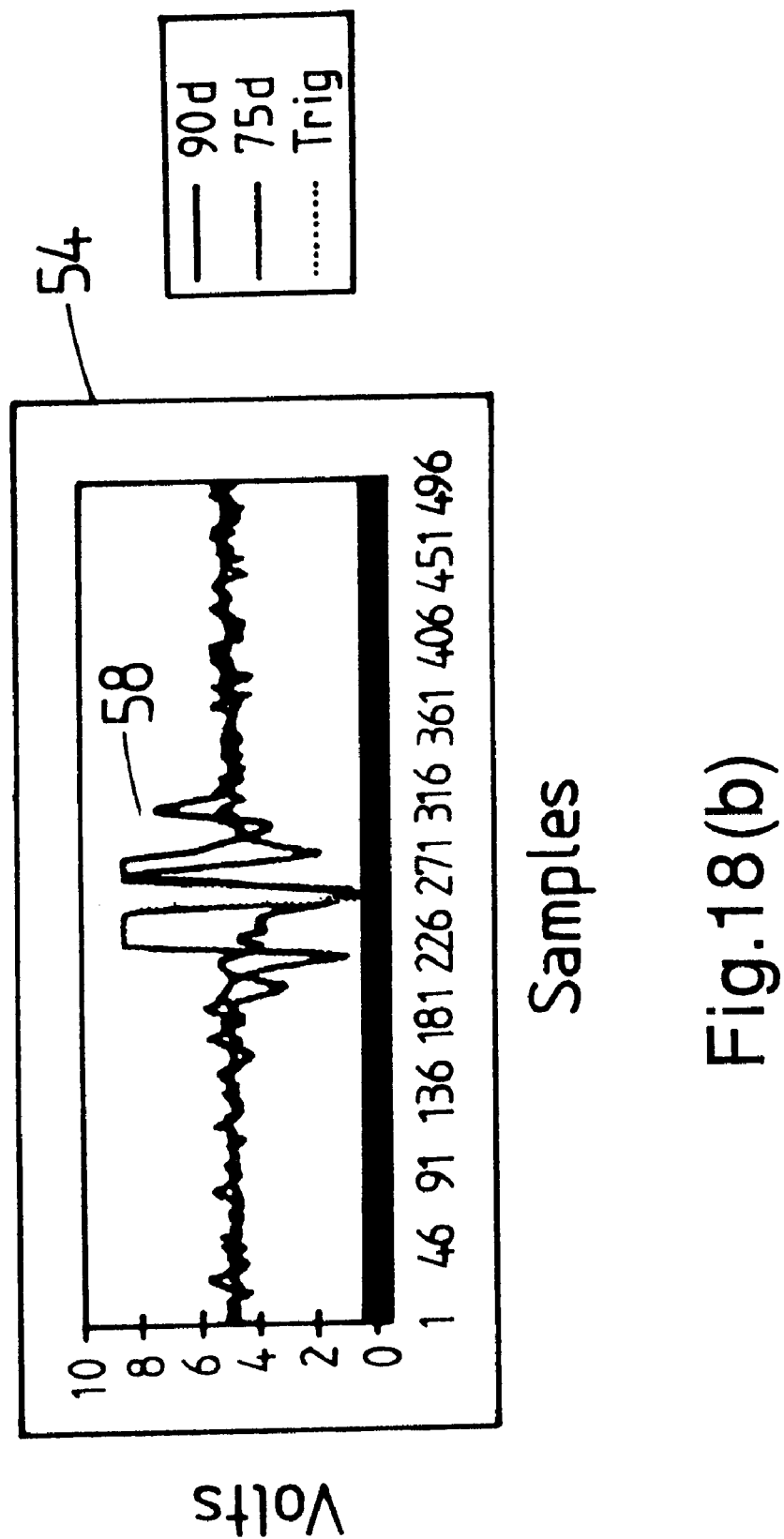

The tracking system 1 can also be implemented using one or more pyroelectric sensors 27 with a signal processing wing detection unit 29. Each sensor 27 has two adjacent pyroelectric sensing elements 40 and 42, as shown in FIG. 17, which are elecrically connected so as to cancel identical signals generated by each element. A plate 44 with a slit 46 is placed above the sensing elements 40 and 42 so as to provide the elements 40 and 42 with different fields of view 48 and 50. The fields of view 48 and 50 are significantly narrower than the field of view of a detection camera discussed previously. If aircraft move above the runway in the direction indicated by the arrow 48, the first element 40 has a front field of view 48 and the second element 42 has a rear field of view 50. As an aircraft 28 passes over the sensor 27 the first element 40 detects the thermal radiation of the aircraft before the second element 42, the aircraft 25 will then be momentarily in both fields of view 48 and 50, and then only detectable by the second element 42. An example of the difference signals generated by two sensors 27 is illustrated in FIG. 18a where the graph 52 is for a sensor 27 which has a field of view that is directed at 90° to the horizontal and a sensor 27 which is directed at 75° to the horizontal. Graph 54 (FIG. 18b) is an expanded view of the centre of graph 52. The zero crossing points of peaks 56 In the graphs 52 and 54 correspond to the point at which the aircraft 28 passes the sensor 27. Using the known position of the sensor 27 the time at which the aircraft passes, and the speed of the aircraft 28, a time can be determined for generating an acquisition signal to trigger the high resolution acquisition cameras 7. The speed can be determined from movement of the zero crossing points over time, in a similar manner to that described previously.

Figure 19:
FIGS. 19 and 20 are images obtained of an aircraft by high resolution cameras of an acquisition system of the aircraft detection system.
Figure 20:
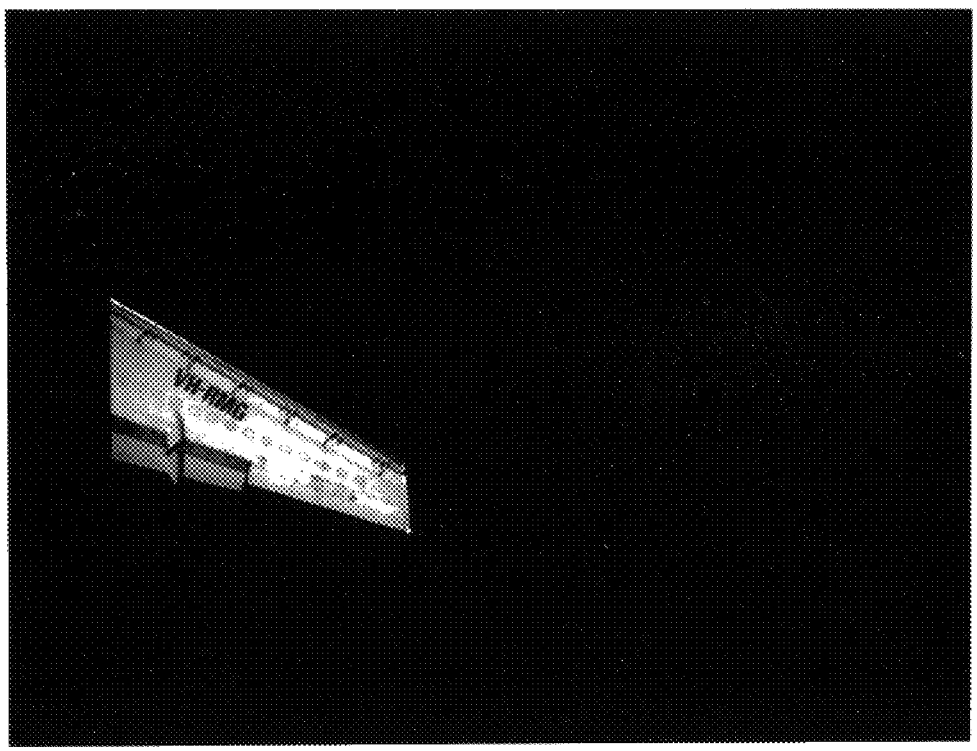

The image acquisition system 10, as mentioned previously, acquires an image of the aircraft with sufficient resolution for the aircraft registration characters to be obtained using optical character recognition. According to one embodiment of the acquisition system 10, the system 10 includes two high resolution cameras 7 each comprising a lens and a CCD detector array. Respective images obtained by the two cameras 7 are shown in FIGS. 19 and 20.

The minimum pixel dimension and the focal length of the lens determine the spatial resolution in the image. If the dimension of a pixel is $L_p$, the focal length f and the altitude of the aircraft is h, then the dimension of a feature $W_{min}$ on the aircraft that is mapped onto a pixel is $$W_{min} = \frac{L_p h}{f} \text{ or } f = \frac{L_p h}{W_{min}} \quad (44)$$

The character recognition process used requires each character stroke to be mapped onto at least four pixels with contrast levels having at least 10% difference from the background. The width of a character stroke in the aircraft registration is regulated by the ICAO. According to the ICAO Report, Annex 7, sections 4.2.1 and 5.3, the character height beneath the port wing must be at least 50 centimeters and the character stroke must be $\frac{1}{6}^{th}$ the character height. Therefore, to satisfy the character recognition criterion, the dimension of the feature on the aircraft that is mapped onto a pixel should be $W_{min}$=2 centimeters, or less. Once the CCD detector is chosen, $L_p$ is fixed and the focal length of the system 10 is determined by the maximum altitude of the aircraft at which the spatial resolution $W_{min}$=2 centimeters is required.

The field of view of the system 10 at altitude h is determined by the spatial resolution $W_{min}$ chosen at altitude $h_{max}$ and the number of pixels $N_{pl}$, along the length of the CCD, $$W_{FOV} = \frac{N_{pl} W_{min} h}{h_{max}} \quad (45)$$

For h=$h_{max}$ and $N_{pl}$=1552 the field of view is $W_{FOV}$=31.04 meters.

To avoid blurring due to motion of the aircraft, the image moves a distance less than the size of a pixel during the exposure. If the aircraft velocity is v, then the time to move a distance equal to the required spatial resolution $W_{min}$ is $$t = \frac{W_{min}}{v} \quad (46)$$

The maximum aircraft velocity that is likely to be encountered on landing or take-off is v=160 knots=82 ms$^{-1}$. With $W_{min}$=0.02 m, the exposure time to avoid excessive blurring is t<240 µs.

The focal length of the lens in the system 10 can be chosen to obtain the required spatial resolution at the maximum altitude. This fixes the field of view. Alternatively, the field of view may be varied by altering the focal length according to the altitude of the aircraft. The range of focal lengths required can be calculated from equation (44).

The aircraft registration, during daylight conditions, is illuminated by sunlight or scattered light reflected from the ground. The aircraft scatters the light that is incident, some of which is captured by the lens of the imaging system. The considerable amount of light reflected from aluminium fuselages of an aircraft can affect the image obtained, and is taken into account. The light power falling onto a pixel of the CCD is given by $$P_p = L_\lambda \Delta \lambda \Omega_{sun} \frac{R_{gnd} R_A A_p}{8 f\#^2} \quad (47)$$

where $L_\lambda$ is the solar spectral radiance, $\Delta\lambda$ is the wavelength bandpass of the entire configuration, $\Omega_{sun}$ is the solid angle subtended by the sun, $R_{gnd}$ is the reflectivity of the ground, $R_A$ is the reflectivity of the aircraft, $A_p$ is the area of a pixel in the CCD detector and f# is the lens f-number.

The solar spectral radiance $L_\lambda$ varies markedly with wavelength λ. The power falling on a pixel will therefore vary over a large range. This can be limited by restricting the wavelength range $\Delta\lambda$ passing to the sensor and optimally choosing the centre wavelength of this range. The optimum range and centre wavelength are chosen to match the characteristics of the imaging sensor.

In one embodiment, the optimum wavelength range and centre wavelength are chosen in the near infrared waveband, 0.69 to 2.0 microns. This limits the variation in light power on a pixel in the sensor to within the useable limits of the sensor. A KODAK™ KAF-1600L imaging sensor (a monolithic silicon sensor with lateral overflow anti-blooming) was chosen that incorporated a mechanism to accommodate a thousandfold saturation of each pixel, giving a total acceptable range of light powers in each pixel of $10^5$. This enables the sensor to produce a useful image of an aircraft when very bright light sources, for example the sun, are in its field of view.

The correct choice of sensor and the correct choice of wavelength range and centre wavelength enables an image to be obtained within a time interval that arrests the motion of the aircraft and that provides an image with sufficient contrast on the aircraft registration to enable digital image processing and recognition of the registration characters.

In choosing the wavelength range and centre wavelength, it was important to avoid dazzling light from the supplementary illumination of the illumination unit 16. The optimum wavelength range was therefore set to between 0.69 µm and 2.0 µm.

The power of sunlight falling onto a pixel directly from the sun is $$P_{p-sun} = L_\lambda \Delta\lambda \frac{A_p \pi}{4 f\#^2} \quad (48)$$

The relative light powers from the sun and from the aircraft registration falling onto a single pixel is $$\frac{P_{p\text{-}sun}}{P_p} = \frac{2\pi}{\Omega_{sun} R_{gnd} R_A} \quad (49)$$

With $\Omega_{sun}=6.8\times10^{-5}$ steradians, $R_{gnd}\approx 0.2$ and $R_A\approx 1$, the ratio is $P_{p\text{-}sun}/P_p=4.6\times10^5$. This provides an estimate of the relative contrast between the image of the sun and the image of the underneath of the aircraft on a CCD pixel. The CCD sensor and system electronics are chosen to accommodate this range of light powers.

In poor lighting conditions, the aircraft registration requires additional illumination from the illumination unit 16. The light source of the unit 16 needs to be sufficient to illuminate the aircraft at its maximum altitude. If the source is designed to emit light into a solid angle that just covers the field of view of the imaging system then the light power incident onto a pixel of the imaging system 10 due to light emitted from the source and reflected from the aircraft is given by $$P_p = P_s \frac{R_A}{8 A_A} \frac{A_p}{N_{ptot} f\#^2} \quad (50)$$

where $A_A$ is the area on the aircraft imaged onto a pixel of area $A_p$, $P_s$ is the light power of the source, $R_A$ is the aircraft reflectivity, $N_{ptot}$ is the total number of pixels in the CCD sensor and f# is the f-number of the lens. The power of the source required to match the daytime reflected illumination is estimated by setting $P_p=7.3\times10^{-11}$ W, $R_A=1$, $A_p=81$ $\mu m^2$, $N_{ptot}=1552\times1032$, f#=1.8 and noting that $A_A=W_{min}^2$ where $W_{min}=0.02$ m. Then $P_s=1.50\times10^4$ W. For a Xenon flash lamp, the flash time is typically t=300 $\mu$s which compares favourably with the exposure time to minimise motion blurring. Then the source must deliver an energy of $E_s=P_s t=$ 4.5 J. This is the light energy in a wavelength band $\Delta\lambda=0.1$ $\mu$m. Xenon flash lamps typically have 10% of their light energy within this bandpass centred around $\lambda=0.8$ $\mu$m. Furthermore, the flash lamp may only be 50% efficient. Thus the electrical energy required is approximately 90 J. Flash lamps that deliver energies of 1500 J in 300 $\mu$s are readily available. Illumination with such a flash lamp during the day reduces the contrast between the direct sun and the aircraft registration, thereby relaxing the requirement for overexposure tolerance of the CCD sensor. This result depends on the flash lamp directing all of its energy into the field of view only and that the lens focal length is optimally chosen to image the region of dimension $W_{min}=0.02$ m onto a single pixel.

In one embodiment, the aperture of the lens on the acquisition camera 7 is automatically adjusted to control the amount of light on the imaging sensor in order to optimise the image quality for digital processing. In the image obtained, the intensity level of the registration characters relative to the underside of the aircraft needs to be maintained to provide good contrast between the two for OCR. The power $P_s$ of the flash 16 is automatically adjusted in accordance with the aperture setting f# of the acquisition camera 7 to optimise the image quality and maintain the relative contrast between the registration characters and the underside of the aircraft, in accordance with the relationship expressed in equation (50). For example, during the day the aperture of the lens may be very small and the power of the flash may be increased to provide additional illumination of the underside, whereas during night conditions, the aperture may be fully opened and the power of the flash reduced considerably as additional illumination is not required. As an alternative, or in addition, the electrical gain of the electronic circuits connected to an acquisition camera 7 is adjusted automatically to optimise the image quality.

Figure 21:
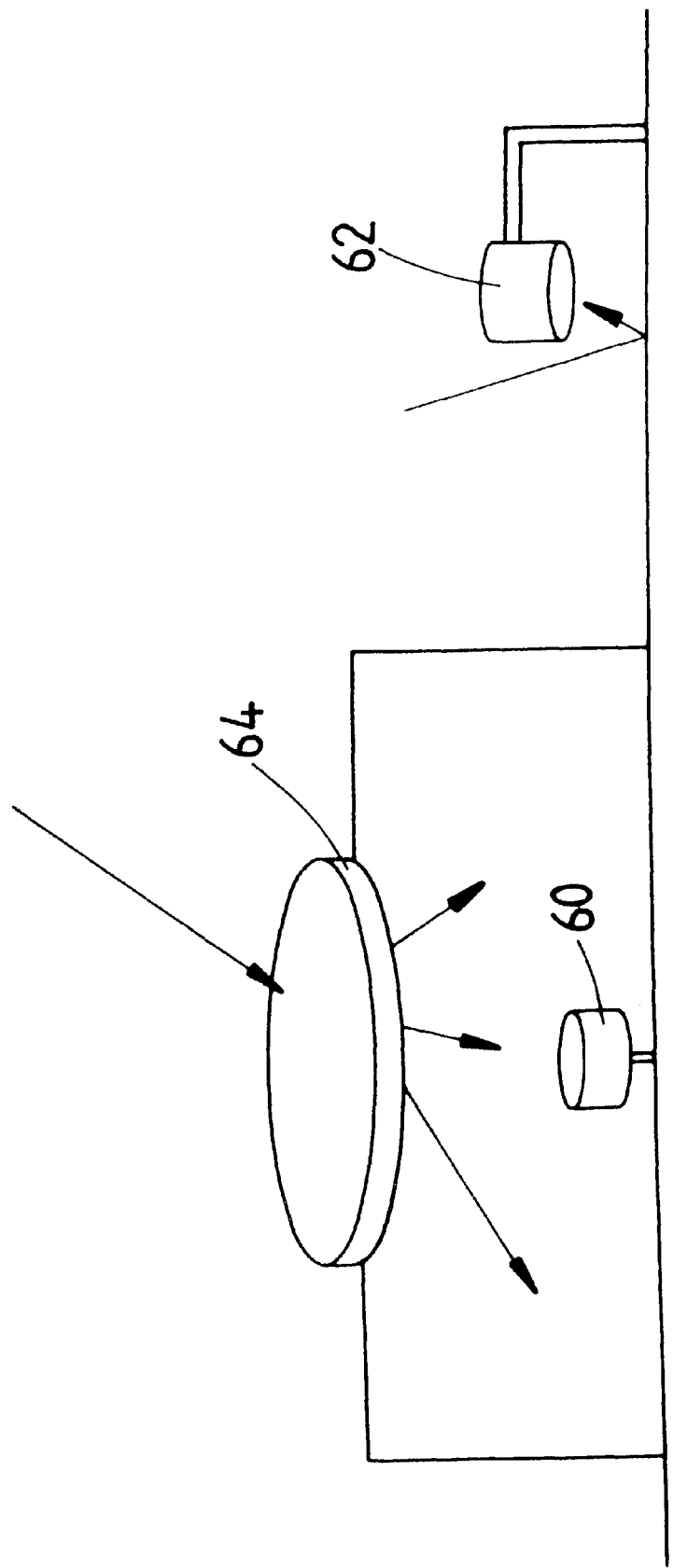
FIG. 21 is a schematic diagram of an optical sensor system used for exposure control of the acquisition cameras.

To appropriately set the camera aperture and/or gain one or more point optical sensors 60, 62, as shown in FIG. 21, are used to measure the ambient lighting conditions. The electrical output signals of the sensors 60, 62 are processed by the acquisition system 10 to produce the information required to control the camera aperture and/or gain. Two point sensors 60, 62 sensitive to the same optical spectrum as the acquisition cameras 7 can be used. One sensor 60 receives light from the sky that passes through a diffusing plate 64 onto the sensor 60. The diffusing plate 64 collects light from many different directions and allows it to reach the sensor 60. The second sensor 62 is directed towards the ground to measure the reflected light from the ground.

The high resolution images obtained of the aircraft by the acquisition system 10 are submitted, as described previously, to the analysis system 12 which performs optical character recognition on the images to extract the registration codes of the aircraft.

Figure 22:
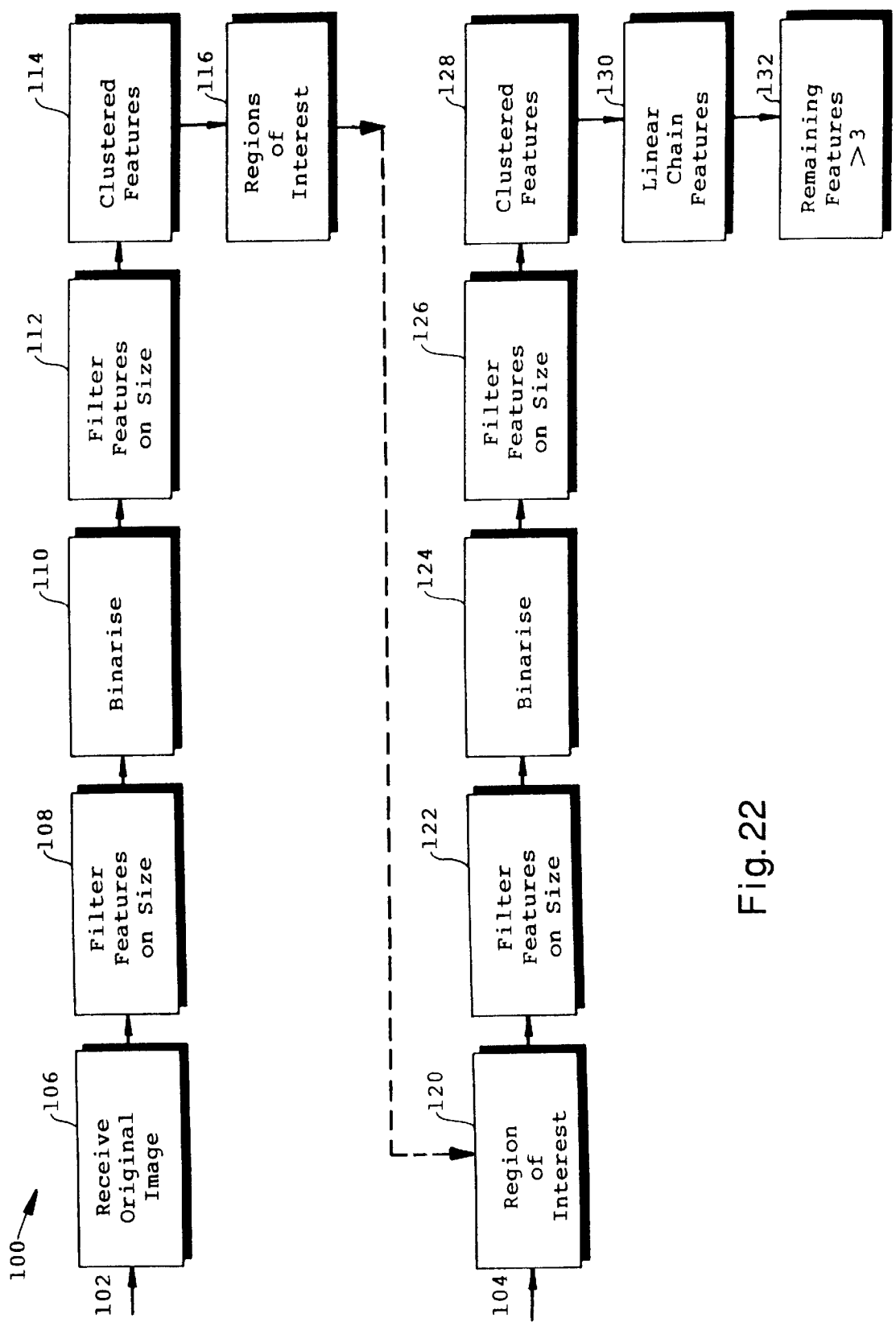
FIG. 22 is a flow diagram of a preferred character location process executed on image data obtained by the high resolution cameras.
Figure 23A:
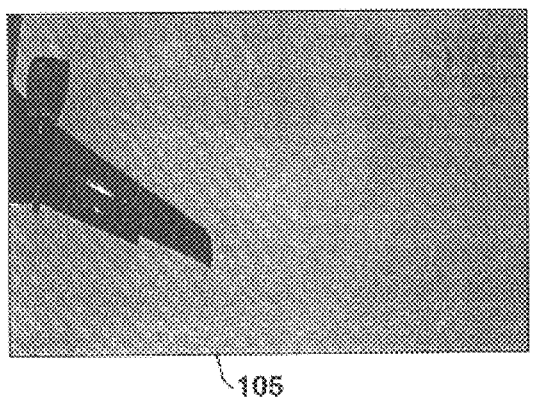
FIGS. 23a–23h are images produced during the character location process.

The analysis system 12 processes the aircraft images obtained by a high resolution camera 7 according to an image processing procedure 100, as shown in FIG. 22, which is divided into two parts 102 and 104. The first part 102 operates on a sub-sampled image 105, as shown in FIG. 23a, to locate regions that contain features that may be registration characters, whereas the second part 104 executes a similar procedure but is done using the full resolution of the original image and is executed only on the regions identified by the first part 102. The sub-sampled image 105 is the original image with one pixel in four removed in both row and column directions, resulting in a one in sixteen sampling ratio. Use of the sub-sampled image improves processing time sixteen-fold.

Figure 23B:
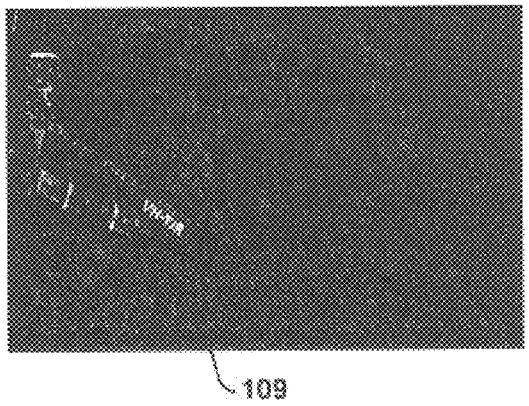
Figure 23C:
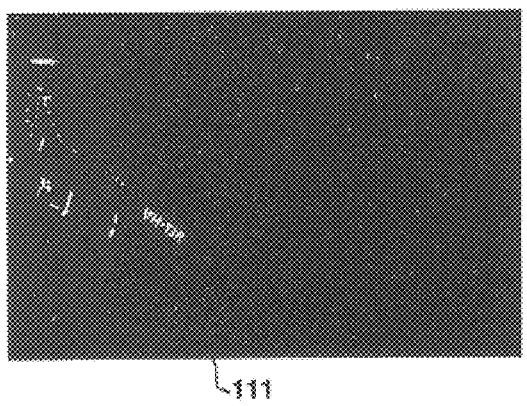
Figure 23D:
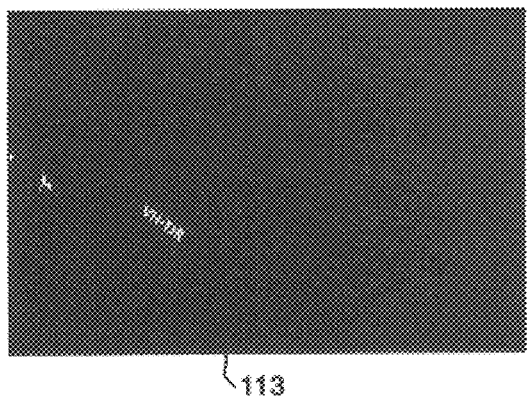
Figure 23E:
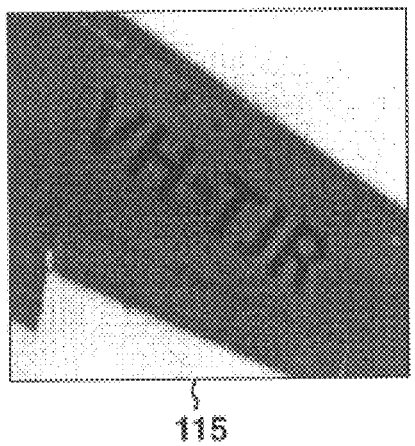

The first part 102 receives the sub-sampled image at step 106 and filters the image to remove features which are larger than the expected size of the registration characters (b) at step 108. Step 108 executes a morphological operation of linear closings applied to a set of lines angled between 0 and 180°. The operation passes a kernel or window across the image 105 to extract lines which exceed a predetermined length and are at a predetermined angle. The kernel or window is passed over the image a number of times and each time the predetermined angle is varied. The lines extracted from all of the passes are then subtracted from the image 105 to provide a filtered difference image 109 (FIG. 23b). The filtered difference image 109 is then thresholded or binarised at step 110 to convert it from a grey scale image to a binary scale image 111 (FIG. 23c). This is done by setting to 1 all image values that are greater than a threshold and setting to 0 all other image values. The threshold at a given point in the image is determined from a specified multiple of standard deviations from the mean calculated from the pixel values within a window centred on the given point. The binarised image 111 is then filtered at step 112 to remove all features that have pixel densities in a bounding box that are smaller or larger than the expected pixel density for a bounded registration character. The image 111 is then processed at step 114 to remove all features which are not clustered together like registration characters. Step 114 achieves this by grouping together features that have similar sizes and that are close to one another. Groups of features that are smaller than a specified size are removed from the image to obtain a cleaned image 113 (FIG. 23d). The cleaned image 113 is then used at step 116 to locate regions of interest. Regions of interest are obtained in step 116 from the location and extents of the groups remaining after step 114. Step 116 produces regions of interest which include the registration characters and areas of the regions are bounded above and below, as for the region 115 shown in FIG. 23e.

Figure 23F:
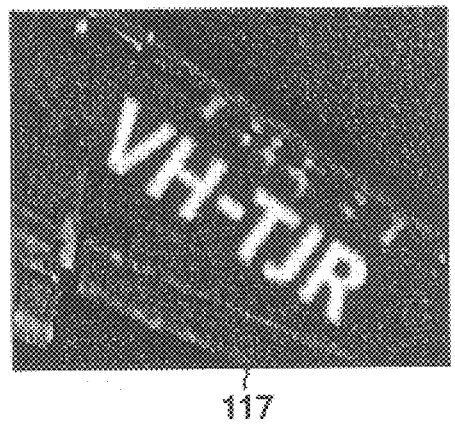
Figure 23G:
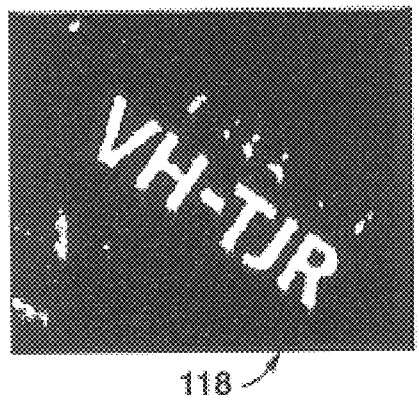
Figure 23H:
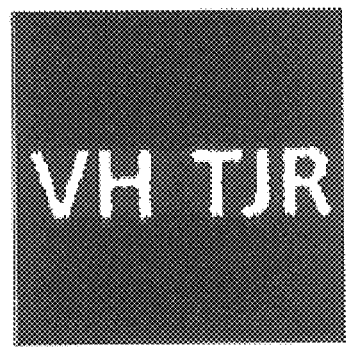

The regions of interest obtained by the first part 102 of the procedure 100 are further processed individually using the full resolution of the original image and the second part 104 of the procedure. The second part 104 takes a region of interest 115 from the original image at step 120 and for that region filters out features larger than the expected character sizes at step 122, using the same morphological operation of linear closings applied to a set of lines angled between 0 and 180°, followed by image subtraction, as described above, to obtain image 117 (FIG. 23f). The filtered image 117 is then binarised at step 124 by selecting a filter threshold that is representative of the pixel values at the edges of features. To distinguish the registration characters from the aircraft wing or body the filter threshold needs to be set correctly. A mask image of significant edges in image 117 is created by calculating edge-strengths at each point in image 117 and setting to 1 all points that have edge-strengths greater than a mask threshold and setting to 0 all other points. An edge-strength is determined by taking at each point pixel gradients in two directions, $\Delta x$ and $\Delta y$, and calculating $\sqrt{\Delta x^2 + \Delta y^2}$ to give the edge-strength at that point. The mask threshold at a given point is determined from a specified multiple of standard deviations from the mean calculated from the edge-strengths within a window centred on the given point. The filter threshold for each point in image 117 is then determined from a specified multiple of standard deviations from the mean calculated from the pixel values at all points within a window centred on the given point that correspond to non-zero values in the mask image. The binarised image 118 (FIG. 23g) is then filtered at step 126 to remove features that are smaller than the expected character sizes. Features are clustered together at step 128 that have similar sizes, that are near to one another and that are associated with similar image values in image 117. At step 130 the correctly clustered features that have sizes, orientations and relative positions that deviate too much from the averages for the clusters are filtered out to leave features that form linear chains. Then at step 132, if the number of features remaining in the image produced by step 130 is greater than 3, then a final image is created by rotating image 118 to align the linear chain of features with the image rows and by masking out features not belonging to the linear chain. The final image is passed to a character recognition process 200 to determine whether the features are registration characters and, if so, which characters.

Figure 24:
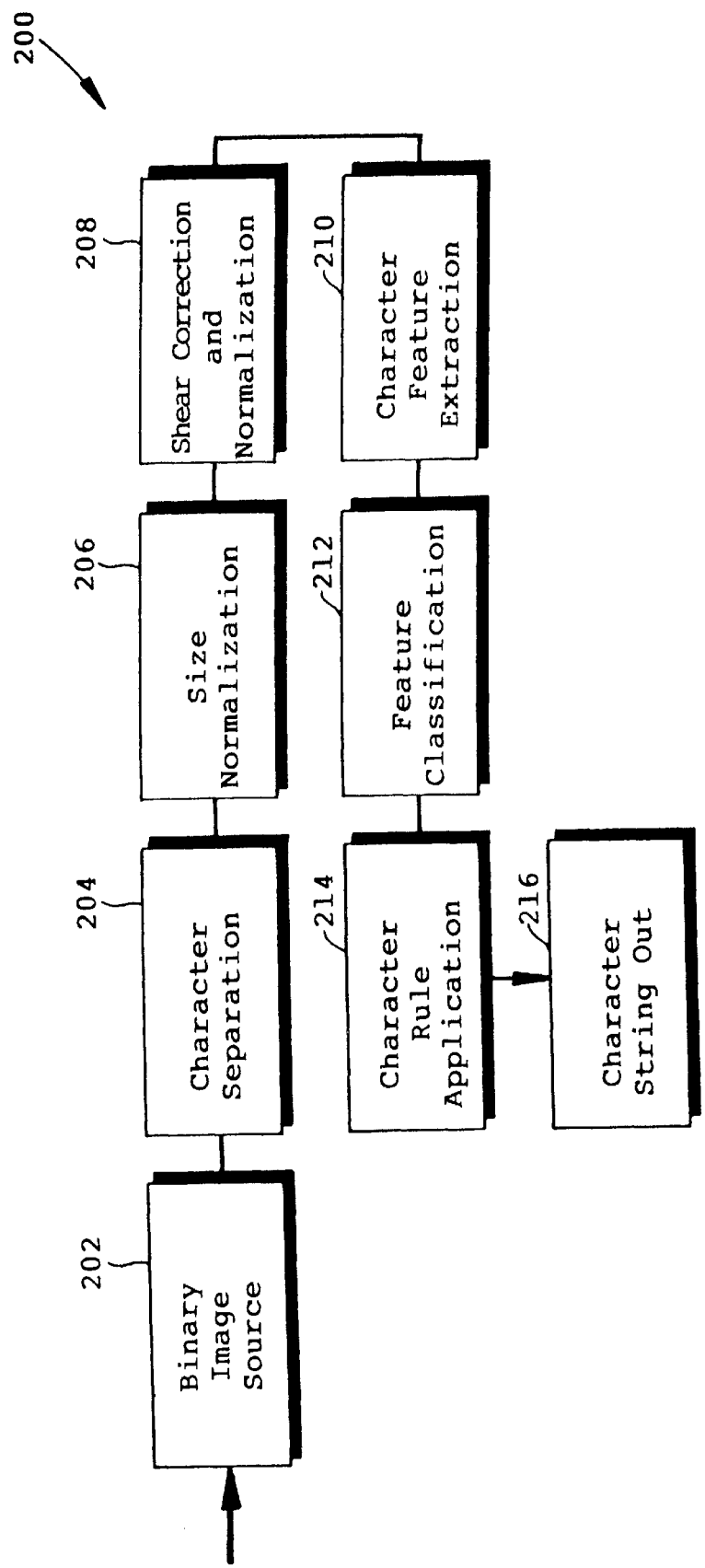
FIG. 24 is a flow diagram of a character recognition process executed on a binary image of the characters extracted from an image obtained by one of the high resolution cameras.

The final image undergoes a standard optical character recognition process 200, as shown in FIG. 24, to generate character string data which represents the ICAO characters on the port wing. The process 200 includes receiving the final image at step 202, which is produced by step 132 of the image processing procedure 100, and separating the characters of the image at step 204. The size of the characters are normalised at step 206 and at step 208 correction for the alignment of the characters is made and further normalization occurs. Character features are extracted at step 210 and an attempt made to classify the features of the characters extracted at step 212. Character rules are applied to the classified features at step 214 so as to produce a binary string representative of the registration characters at step 216.

Although the system 2 has been described above as being one which is particularly suitable for detecting an aircraft, it should be noted that many features of the system can be used for detecting and identifying other moving objects. For example, the embodiments of the tracking system 1 may be used for tracking land vehicles. The system 2 may be employed to acquire images of and identify automobiles at tollway points on a roadway.

Appendix A lists software for the tracking system 1, Appendix B lists software for the acquisition system 10 and Appendix C lists the software for the analysis system 12.

Many modifications will be apparent to those skilled in the art without departing from the scope of the present invention as hereinbefore described with reference to the accompanying drawings.

What is claimed is:

1. An object detection system including:

passive sensing means for receiving electromagnetic radiation from a moving object in a field of view and generating intensity signals representative of the received radiation and for generating images of said radiation at successive periods of time from said intensity signals; and processing means for processing said images to obtain a background image, subtracting said background image from said images to obtain respective difference images, summing pixel values across a dimension of said difference images to obtain respective image profiles, and generating difference profiles of said image profiles by obtaining the difference between successive ones of said image profiles, said difference profiles representing time derivatives of the image profiles and providing a differential signature representative of the position of said moving object.

2. An object detection system as in claim 1, wherein said processing means generates an image acquisition signal on the basis of said differential signature.

3. An object detection system as in claim 2, including acquisition means, responsive to said acquisition signal, for acquiring an image of at least part of said moving object; and analysis means for processing said image to identify said moving object.

4. An object detection system as in claim 3, wherein said analysis system processes said acquired image to extract markings to identify said moving object.

5. An object detection system as in claim 1, wherein said moving object is an aircraft.

6. An object detection system as in claim 5, wherein said aircraft is in flight.

7. An object detection system as in claim 5, wherein said electromagnetic radiation is thermal radiation.

8. An object detection system as in claim 5, including:

proximity detecting means for detecting the presence of said aircraft within a predetermined region and, in response thereto, generating an activation signal for said passive sensing means.

9. An object detection system as in claim 1 wherein:

said position corresponds to a zero crossing point in said difference profiles where a difference profile has risen above a first predetermined threshold for at least a first predetermined distance and then falls to below a second predetermined threshold for a second predetermined distance.

10. An object detection system as in claim 9, wherein:

said processing means monitors the movement of said position in successive ones of said difference profiles and determines the time for generation of an image acquisition signal.

11. An object detection system including:

passive sensing means for receiving electromagnetic radiation from a moving object and generating intensity signals representative of the received radiation, said passive sensing means having pyroelectric sensors with different fields of view and said intensity signals including at least first and second signals representative of the thermal radiation present in said views, respectively, and processing means for subtracting said intensity signals to obtain a differential signature representative of the position of said moving object, said processing means subtracting said first and second signals to obtain a differential signal including said differential signature.

12. An object detection system as in claim 11, wherein; said processing means determines a time for generation of an image acquisition signal on the basis of the position of said passive sensing means, the time of generation of said differential signature and the speed of said moving object.

13. An object detection system as in claim 12, wherein: said time of generation of an image acquisition signal and said speed are determined from a zero crossing point of said differential signature.

14. An image acquisition system including:
at least one camera for acquiring an image of at least part of a moving object, in response to a trigger signal, and
analysis means for processing said image to locate a region in said image including markings identifying said object and for processing said region to extract said markings for a recognition process, such that said analysis means sub-samples said image, extracts lines exceeding a predetermined length and at predetermined angles, binarises the image, removes features smaller or larger than said markings, removes features not clustered as said markings, and locates said region using the remaining features.

15. An image acquisition system as in claim 14, wherein said camera images received radiation between 0.69 to 2.0 μm.

16. An image acquisition system as in claim 15, wherein said camera has an exposure time of <240μs.

17. An image acquisition system as in claim 15, including an infrared flash having its power adjusted on the basis of the aperture setting of said camera.

18. An image acquisition system as in claim 15, including optical sensor means positioned to obtain measurements of ambient direct light and reflected light for the field of view of said camera and adjust settings of said camera on the basis of said measurements.

19. An image acquisition system as in claim 14 wherein said analysis means extracts said region from said image and processes said region by:
removing features larger than expected marking sizes, binarising said region,
removing features smaller than expected marking sizes,
removing features not clustered as identifying markings, and
passing the remaining image for optical recognition if including more than a predetermined number of markings.

20. An image acquisition system as in claim 15, wherein said moving object is an aircraft.

21. An image acquisition system as in claim 20, wherein said aircraft is in flight.

22. An object detection system as in claim 2, including an image acquisition system including:
at least one camera for acquiring an image of at least part of a moving object in response to a trigger signal, and
analysis means for processing said image to locate a region in said image including markings identifying said object and processing said region to extract said markings for optical recognition, wherein said trigger signal is said image acquisition signal.

23. An object detection method including:
passively sensing electromagnetic radiation received from a moving object in a field of view;
generating intensity signals representative of the received radiation;
generating images of said radiation at successive periods of time from said intensity signals;
processing said images to obtain a background image;
subtracting said background image from said images to obtain respective difference images;
summing pixel values across a dimension of said difference images to obtain respective image profiles; and
generating difference profiles of said image profiles by obtaining the difference between successive ones of said image profiles, said difference profiles representing time derivatives of the image profiles and providing a differential signature representative of the position of said moving object.

24. An object detection method as in claim 23, including generating an image acquisition signal on the basis of said differential signature.

25. An object detection method as in claim 24, including:
acquiring an image of at least part of said moving object in response to said acquisition signal; and
processing said image to identify said moving object.

26. An object detection method as in claim 25, including processing said acquired image to extract markings identifying said moving object.

27. An object detection method as in claim 23, wherein said moving object is an aircraft.

28. An object detection method as in claim 27, wherein said aircraft is in flight.

29. An object detection method as in claim 27, wherein said electromagnetic radiation is thermal radiation.

30. An object detection method as in claim 27, including:
detecting the presence of said aircraft within a predetermined region, and, in response thereto, generating an activation signal to execute said passive sensing step.

31. An object detection method as in claim 23 wherein:
said position corresponds to a zero crossing point in said difference profiles wherein a difference profile has risen above a first predetermined threshold for at least a first predetermined distance and then falls to below a second predetermined threshold for a second predetermined distance.

32. An object detection method as in claim 31, including:
monitoring the movement of said position in successive ones of said difference profiles and determining the time for generation of an image acquisition signal.

33. An object detection method including:
passively sensing electromagnetic radiation received from a moving object;
generating intensity signals representative of the received radiation; and
subtracting said intensity signals to obtain a differential signature representative of the position of said moving object,
said passive sensing including pyroelectric sensing with different fields of view, said intensity signals including at least first and second signals representative of the thermal radiation present in said views, respectively, and said subtracting including subtracting said first and second signals to obtain a differential signal including said differential signature.

34. An object detection method as in claim 33, including:

determining a time for generation of an image acquisition signal on the basis of the position of passive sensors, the time of generation of said differential signature and the speed of said moving object.

35. An object detection method as in claim 34, wherein said time of generation of said image acquisition signal and speed are determined from a zero crossing point of said differential signature.

36. An image acquisition method including:

acquiring an image of at least part of a moving object, in response to a trigger signal, using at least one camera, and processing said image to locate a region in said image including markings identifying said object and processing said region to extract said markings for recognition process, said processing to locate said region including sub-sampling said image, extracting lines exceeding a predetermined length and at predetermined angles, binarising the image, removing features smaller or larger than said markings, removing features not clustered as said markings, and locating said region using the remaining features.

37. An image acquisition method as in claim 36, wherein said camera images received radiation between 0.69 to 2.0 μm.

38. An image acquisition method as in claim 37, wherein said camera has an exposure time of <240 μs.

39. An image acquisition method as in claim 37, including:

adjusting the power of an infrared flash for said camera on the basis of the aperture setting of said camera.

40. An image acquisition method as in claim 37, including:

obtaining automatic measurements of ambient direct light and reflected light for the field of view of said camera, and adjusting settings of said camera on the basis of said measurements.

41. An image acquisition method as in claim 36 wherein said region processing includes:

extracting said region from said image, removing features larger than expected marking sizes, binarising said region, removing features with areas smaller or larger than expected marking areas, removing features not clustered as identifying markings, and passing the remaining image for optical recognition if including more than a predetermined number of markings.

42. An image acquisition method as in claim 37, wherein said moving object is an aircraft.

43. An image acquisition method as in claim 42, wherein said aircraft is in flight.

44. An object detection method as in claim 24, including an image acquisition method including:

acquiring an image of at least part of a moving object, in response to a trigger signal, using at least one camera, and processing said image to locate a region in said image including markings identifying said object and processing said region to extract said markings for optical recognition, wherein said trigger signal is said image acquisition signal.

* * * * *

UNITED STATES PATENT AND TRADEMARK OFFICE

CERTIFICATE OF CORRECTION

PATENT NO.   : 5,974,158
DATED        : October 26, 1999
INVENTOR(S)  : AUTY et al It is certified that error appears in the above-identified patent and that said letters patent is hereby corrected as shown below:

Front page format:

At [73] Assignee should read --Commonwealth Scientific and Industrial Research Organization, Campbell, Australia Signed and Sealed this Thirteenth Day of June, 2000

Attest:

Attesting Officer

Q. TODD DICKINSON

Director of Patents and Trademarks